US012566433B2

(12) United States Patent
Choudry et al.

(10) Patent No.: US 12,566,433 B2
(45) Date of Patent: Mar. 3, 2026

(54) DISPLAY AUGMENTATION

(71) Applicant: Zoox, Inc., Foster City, CA (US)

(72) Inventors: Muhammad Umar Choudry, Seattle, WA (US); Meredith James Goldman, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 266 days.

(21) Appl. No.: 18/452,899

(22) Filed: Aug. 21, 2023

(65) Prior Publication Data

US 2025/0068159 A1 Feb. 27, 2025

(51) Int. Cl.
| | |
|---|---|
| *G06T 7/73* | (2017.01) |
| *B60W 60/00* | (2020.01) |
| *G05D 1/00* | (2006.01) |
| *G06F 3/14* | (2006.01) |
| *G06T 11/20* | (2006.01) |
| *G06F 3/0482* | (2013.01) |

(52) U.S. Cl.
CPC ......... *G05D 1/0038* (2013.01); *B60W 60/001* (2020.02); *G06F 3/14* (2013.01); *G06T 7/73* (2017.01); *G06T 11/20* (2013.01); *G06F 3/0482* (2013.01); *G06T 2207/10016* (2013.01); *G06T 2207/30252* (2013.01)

(58) Field of Classification Search
CPC ..................... G06F 3/0482; G06F 3/14; G06T 2207/10016; G06T 2207/30252; G06T 7/73; G06T 11/20; G05D 1/0038; B60W 60/001
See application file for complete search history.

(56) References Cited

U.S. PATENT DOCUMENTS

| | | | | |
|---|---|---|---|---|
| 10,649,459 B2 * | 5/2020 | Wang | ................... | G06V 10/764 |
| 11,644,830 B1 * | 5/2023 | Gate | .................... | G05D 1/0038 701/2 |
| 2012/0083960 A1 * | 4/2012 | Zhu | .......................... | B60R 1/23 701/23 |
| 2015/0248131 A1 * | 9/2015 | Fairfield | .............. | G05D 1/0038 701/2 |

(Continued)

FOREIGN PATENT DOCUMENTS

| | | |
|---|---|---|
| EP | 3816751 A1 | 5/2021 |
| WO | 2021034751 A1 | 2/2021 |

OTHER PUBLICATIONS

International Search Report and Written Opinion dated Nov. 18, 2024 for International PCT Application No. PCT/US2024/042075.

*Primary Examiner* — Anil K Bhargava
(74) *Attorney, Agent, or Firm* — EIP US LLP

(57) ABSTRACT

A method is provided, comprising: (i) receiving, at a system, from an autonomous vehicle: (a) sensor data captured by a sensor of the vehicle, and (b) output data generated based on environmental data captured by one or more sensors of the vehicle and used by a planning component to navigate in an environment, (ii) causing one or more displays to display at least one of: a representation of the sensor data, or a model of the environment based on the output data, (iii) determining a location of a feature within the sensor data or the model, (iv) causing the one or more displays to display an indication of the feature at a position corresponding to the location, (v) receiving, at the system, user input, and (vi) sending, by the system to the vehicle, data based on the user input to cause the vehicle to take an action.

18 Claims, 17 Drawing Sheets

(56)  References Cited

U.S. PATENT DOCUMENTS

| | | | | |
|---|---|---|---|---|
| 2017/0003681 A1* | 1/2017 | Ross | .................... | G05D 1/0274 |
| 2019/0196464 A1* | 6/2019 | Lockwood | ........... | G05D 1/0022 |
| 2020/0338983 A1* | 10/2020 | Alalao | ................... | B60K 35/22 |
| 2020/0401135 A1* | 12/2020 | Chen | .................... | G05D 1/0038 |
| 2021/0048814 A1* | 2/2021 | Ghorbanian-Matloob | .................. | |
| | | | | G05D 1/0027 |
| 2021/0323573 A1* | 10/2021 | Gogna | ............... | G01C 21/3407 |
| 2024/0317250 A1* | 9/2024 | Chilton | ................. | B60K 35/00 |

* cited by examiner

DISPLAY AUGMENTATION

BACKGROUND

Autonomous and partially autonomous vehicles are increasingly being tested and used not only for convenience, but also to improve road safety. Autonomous vehicles may have a combination of different sensors that can be used to detect nearby objects to help the vehicle navigate through the environment.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
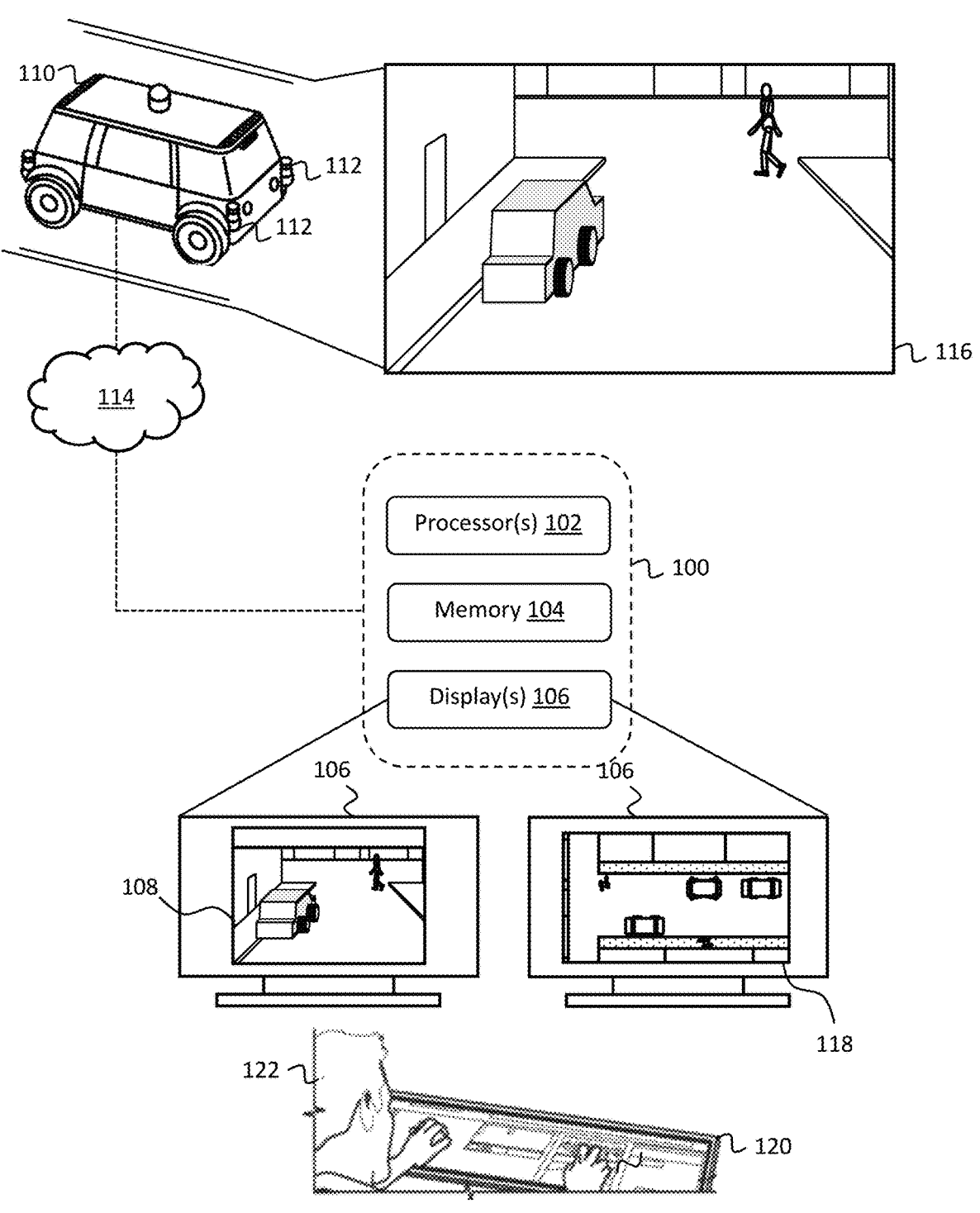
FIG. 1 is a pictorial diagram of system, including a vehicle and remote system for monitoring the vehicle, according to an example.

This application relates to systems, methods and computer-readable media for improving the ability of a human operator (also known as a teleoperator) to understand the environment in which an autonomous vehicle is located by combining one or more elements from one view presented to the operator (such as a video captured by the vehicle) with one or more elements of another view presented to the operator (such as a model of the environment). This allows the operator to have a clearer overview of the environment, which in turn allows the operator to make more informed decisions, such as provide more informed instructions to remotely control the vehicle.

A human operator may monitor an autonomous vehicle and/or provide an instruction, such as a driving instruction, to the autonomous vehicle at certain times. A vehicle may request that an operator provide it with instructions in certain scenarios, such when the vehicle is unsure how to proceed next. The operator may be located remote from the vehicle, and can therefore monitor and/or control the vehicle from a remote system. To enable the operator to monitor/control the vehicle, the operator may be presented with data from the vehicle. For example, the vehicle may have one or more sensors (such as one or more video cameras) which capture sensor data (such as video frame data) and transmit the sensor data to the remote system. A representation of sensor data such as video frame data may be displayed to the operator on one or more displays, so that the operator can see the environment around the vehicle. The representation of the video frame data may be shown to the operator as a view, in some examples.

The video frame data may be human interpretable. For example, video frame data may correspond to a view that a human would see were they located in the same place as the video camera recording the video frame data. Other sensors on the vehicle may also provide human interpretable data for viewing by the operator. For example, an infrared camera may also provide sensor data that is human interpretable, even though it may differ to how a human would perceive the environment. Sensor data, other than video frame data, may be useful in particular weather conditions. For example, in foggy conditions, other sensor data may be more useful than video frame data. It will be appreciated that throughout this disclosure, any reference to "video data" or "video frame data" may be replaced by "sensor data" where the sensor data is recorded/captured by one or more sensors, such as one or more cameras, on the vehicle. Sensor data may include video frame data for example, or may include other sensor data that can be visually displayed to an operator. In examples, the video frame data may be raw sensor data received from the vehicle which may include sensor data processed by an ASIC (Application Specific Integrated Circuit) or other processor of a sensor (e.g., an image signal processer) as opposed to being further processed by a perception component.

The vehicle may also generate output data that the vehicle itself uses to navigate through the environment (although in some cases, the video frame data may also be used by the vehicle to navigate through the environment). For example, environmental data may be captured by one or more sensors (such as lidar devices, radar devices, etc.), and be processed to provide output data which is used by a planning component of the vehicle to navigate through the environment. The output data may therefore be indicative of how the vehicle perceives the environment, and may be based on environmental data. The output data may also be sent to the system.

This output data may not be particularly human interpretable (at least initially), as may be the case for video frame data, for example. However, the output data may be used by the vehicle and/or the system to generate a model, such as a 2D or 3D rendered graphical model, of the environment. Such a model may be human interpretable whereas data used the generate the model may not. The model may be displayed to the operator. The display of the model may be shown to the operator as a view, in some examples.

As will be explained in more detail below, the output data may comprise perception output data, where the perception output data is generated by a perception component of the vehicle. The perception component can detect features/objects in the environment surrounding the vehicle by combining environmental data from one or more sensors. The perception component may classify the objects, and determine other characteristics associated with the object, such as position, velocity, etc. The output data may additionally comprise prediction output data, where the prediction output data is generated by a prediction component of the vehicle. The prediction component may generate one or more probability maps representing prediction probabilities of possible locations of one or more objects in the environment. The output data can therefore be used to generate the model, and thereby represent the objects in the environment.

When the model and video frame data are displayed for viewing by the operator, the operator may more easily see information in the representation of the video frame data compared to the model. The video camera may have a different field of view compared to the sensors used to generate the output data (which is used to generate the model). As such, a feature/object may be visible in the representation of the video frame data but not in the model. Conversely, given that the output data may be based on environmental data gathered by several different types of sensor (in contrast to video frame data, which may be captured by one or more video cameras), the model may provide a more complete overview of the environment around the vehicle. The operator may therefore more easily see information in the model compared to the representation of the video frame data, in some cases. For example, features/objects may be obscured by other features/objects in the video frame data (and so may not be seen by the operator), but those features may be visible in the model.

Given that different information may be gleaned from the two different "views" presented to the operator, it may be useful to combine information from the video frame data and model into one view. For example, if a feature is visible in the model, but not in the video frame data, an indication of that feature may be provided/displayed in the representation of the video frame data (or vice versa). The operator may therefore be provided with an enriched view of the environment within a single view, without necessarily having to refer to both views and/or may be able to visualize discrepancies between the two.

As will become apparent, this "augmentation" of features from different views may be done automatically (such as when the system detects that a feature is missing from one view, or is more difficult to see), or it may be initiated by the operator based on user input. For example, the operator may provide user input at a particular position in one view, such as in the model view presented to the operator, which causes the system to indicate in the other view, a corresponding position associated with the user input.

As an example, an operator may provide a user input (such as a "click" or "press" or "drag") on a particular feature in the video view which causes an indication of the feature to be displayed in the model view. The user can then see where in the model view the same feature is found, which may help the operator plan a navigation path for the vehicle. The indication of the feature in the other view may be a marker, such as a dot, star, cross, etc. For example, if the operator clicks on a pedestrian in the video view, a marker may appear on top of the same pedestrian as depicted in the model view. If the pedestrian is not depicted in the model view (perhaps because of missing data), a marker may appear in the corresponding location where the pedestrian should be. In examples, if the feature is already present in the model view, the feature may be indicated in a way that makes the feature more visually apparent to the operator. For example, if the operator clicks on a vehicle in the video view, the model of the same vehicle within the model view may be highlighted, such as by changing or accentuating its colour, or adding a boundary, such as a circle, around the vehicle. In another example, the indication of the feature in the other view may be an image of the feature. For example, if the operator clicks on a vehicle in the video view, an image of the vehicle (or a generic vehicle or a graphical model of a vehicle) may be generated in the model view. Images of the feature may be added when the feature is not fully or partially present in the other view.

In examples where a feature/object is visible to the operator in the video view, but is missing from the output data (so the same feature is not present in the model view), additional output data (such as perception data) associated with the feature may be generated and sent to the vehicle for use by the planning component of the vehicle to navigate in the environment. The additional output data may comprise data associated with the feature (such as a classification of the feature) and a location of the feature within the environment based on the position of the feature within the view(s). The location may be a location within a coordinate system of the output data. Additional output data can therefore be provided to the vehicle which can improve the vehicle's perception of the environment. The vehicle is therefore being informed of an additional feature that it should be aware of in its environment.

As another example, the operator may provide a user input to modify or generate a navigation path for the vehicle in one view. The feature (i.e., the modified or generated navigation path) may therefore be modified or generated in one view, and an indication of the feature may be displayed in the other view. The user input may comprise one or more clicks, touches, drags, etc. to modify or generate the navigation path. For example, the operator may plot a navigation path for the vehicle in the model view, and the navigation path may be overlayed in the video view (or vice versa). This can show the operator where in the video view the vehicle should navigate.

As another example, the operator may provide a user input in one view (such as clicking on an object visible in the view) which causes an indication of a predicted path associated with the object to be displayed in the other view. For example, the operator may click on a pedestrian in the model view, which causes a predicted path associated with the pedestrian to be overlayed in the video view (or vice versa).

In another example, the operator may provide a user input to provide further information associated with the feature. The further information provided by the operator may be sent to the vehicle, and the planning component of the vehicle may use the further information to navigate in the environment.

As an example, the vehicle may incorrectly, or be unable to, classify an object/feature, or may classify an object with a low confidence. The classification of objects in the environment surrounding the vehicle may be performed by a perception component of the vehicle, and the classification of the objects may be sent to the remote system as part of the output data. In such cases, the operator may therefore provide user input to classify or re-classify a particular feature/object, which is then sent to the vehicle, so that the vehicle can navigate appropriately. For example, a feature/object may be misclassified in the model, and a user may provide a first user input (such as a click) on the feature in the video view which causes an indication of the feature to be displayed in the model view (or vice versa). A second user input from the user may provide a classification for the feature/object, and the classification is then sent to the vehicle.

As another example, the operator may provide user input to provide a driving instruction for the vehicle. For example, a first user input may select a particular feature/object, and a second user input may provide a driving instruction associated with the feature/object, such as "navigate around", "stop", "wait", "ignore", "continue", etc. As an example, some litter may be present on the road. In some cases, the vehicle may be unsure how to classify the object, or may incorrectly classify the object. The operator may therefore click on the litter and instruct the vehicle to ignore or navigate around the litter. As before, clicking on the object in one view (such as the video view) may cause an indication of the object to be displayed in the other view (such as the model view), which can inform the operator that they are clicking on the correct object, so that the driving instruction is associated with the same object as perceived by the vehicle.

Accordingly, in examples described herein, there is provided a system comprising one or more processors and one or more non-transitory computer readable media having instructions stored thereon which, when executed by the one or more processors, cause the one or more processors (or the system) to perform operations comprising: (i) receiving, at the system, from an autonomous vehicle: (a) video frame data captured by a video camera of the vehicle, and (b)

perception output data generated by the vehicle, wherein the perception output data is generated based at least in part on environmental data captured by one or more sensors of the vehicle and is used by a planning component of the vehicle to navigate in an environment, wherein the video frame data and perception output data are indicative of the environment, (ii) causing a first area of one or more displays to display a representation of the video frame data, (iii) causing a second area of the one or more displays to display a model of the environment based on the perception output data, (iv) receiving, at the system, user input, the user input being associated with a feature within one of the first area or the second area. (v) determining a first position within the first area or the second area associated with the feature, (vi) determining, based at least in part on the first position, a second position of the feature within the other of the first area or the second area, (vii) based at least in part on whether the first position is within the first area or the second area of the one or more displays, causing the one or more displays to display in the other of the first area or the second area an indication of the feature at the second position, and (viii) sending, by the system to the vehicle, data based at least in part on the user input to cause the vehicle to take an action.

The system may be a remote system, such as a remote system used by an operator to monitor and/or control the vehicle. The system may be communicatively coupled to the vehicle, such as via one or more wired and/or wireless networks.

The present disclosure therefore relates to receiving a user input associated with a feature in one "view" (i.e., in the first area or the second area) and responsively causing an indication of the feature to be displayed in the other view (i.e., in the other of the first area or the second area). This can be achieved by determining where in the view the user input is received (i.e., the first position), determining the location in the environment to which this position corresponds (such as the physical coordinates), and then determining where in the other view the feature should be indicated (i.e., the second position). The first position is therefore a position on the one or more displays (within the first area or the second area) and the second position is another position on the one or more displays (within the other of the first area or the second area). The first and second positions may correspond to x, y pixel coordinates on one or more displays, for example. Both the first and second positions correspond to the same physical location within the environment (since they are associated with the same feature/object). In some cases, the video frame data and the model and output data (such as the perception output data) may be associated with a coordinate system. In examples, the first and second positions (in 2D space) may be converted into a 3D location within the environment, as explained in more detail below.

In examples, the feature may be a feature of the environment, such as an agent, a vehicle, a pedestrian, a bicycle, etc. The feature may therefore already be displayed when the user input is received and associated with the feature. In other examples, the feature may be a feature generated based on the user input, such as a navigation path for the vehicle. The feature may therefore not be displayed when the user input is received, but the feature is nevertheless associated with the user input.

The user input may comprise a single input or may comprise a plurality of inputs. The plurality of inputs may be received by the system at different times. For example, a first user input may correspond to a user selecting a position within one of the first area or the second area of the display(s), and a second user input may correspond to a driving instruction or classification, where the data sent by the system to the vehicle comprises the driving instruction or classification.

As briefly mentioned above, in some examples, rather than requiring a user to provide a user input in one view to cause an indication of a feature to be displayed in the other view, a feature associated with one view may be automatically displayed in the other view. For example, the output data may comprise data associated with roads, pavements, intersections, traffic signals, etc., such as lane markers or boundaries, and those lane markers or boundaries may be overlayed in the video view. The data associated with roads, pavements, intersections, traffic signals, etc., may be known as map data, where the map data contains location information associated with one or more map features (such as roads, etc.). The output data may therefore comprise map data, which may be incorporated automatically (or upon user request) into the video view. In examples, the map features may be visible in the model by default. In another example, the output data may comprise route data for the vehicle, such as a navigation path or "corridor", where the corridor defines a safe region through which the vehicle can navigate, and the route data may be overlayed in the video view. The route data may be generated by a planning component or prediction component of the vehicle, for example. The route data again may be associated with location information. For example, a corridor or navigation path may be defined by one or more points, where each point is associated with a location in the environment. The route data may therefore be incorporated automatically (or upon user request) into the video view. In examples, the route data may be visible in the model by default. In examples, at least a portion of the route data is determined by the system (so not necessarily received from the vehicle, although the route data, such as the corridor, may be determined by the system using data received from the vehicle). In other examples, the route data is received by the system from the vehicle.

As another example, if it is determined that a feature is present in only one of the video frame data or the output data (so the feature is visible in only one view, such as the feature is missing from the model view, or is hidden/obscured in the video view), an indication of the feature may be automatically displayed in the view where the feature is not present.

As another example, if it is detected that the environment (such as the output data) contains a priority agent/object (such as an emergency vehicle), an indication of the priority agent may be displayed in the video view (or vice versa). This may be useful to accentuate the priority agent to the operator, in case the priority agent is not visible or is hard to see within one view.

As another example, colours within the video view may be incorporated into the model view.

In examples, both views (that is, the representation of the video frame data and the model) are not necessarily displayed simultaneously. For example, an operator may provide a user input in one view, and then switch to another view, where the indication of the feature is displayed. As another example, both views may not need to be displayed simultaneously in cases where user input is not required to cause the indication of the feature be displayed (i.e., when this happens automatically, as mentioned above). As also previously mentioned, rather than displaying a representation of video frame data, a representation of more general sensor data may be displayed.

Accordingly, in examples described herein, there is provided a system comprising one or more processors and one or more non-transitory computer readable media having instructions stored thereon which, when executed by the one or more processors, cause the one or more processors to perform operations comprising: (i) receiving, at the system, from an autonomous vehicle: (a) sensor data captured by a sensor of the vehicle, and (b) output data generated by the vehicle, wherein the output data is generated based at least in part on environmental data captured by one or more sensors of the vehicle and is used by a planning component of the vehicle to navigate in an environment, wherein the sensor data and output data are indicative of the environment, (ii) causing one or more displays to display at least one of: (a) a representation of the sensor data, or (b) a model of the environment based on the output data, (iii) determining a location of a feature within the sensor data or the model, (iv) causing the one or more displays to display an indication of the feature at a position on the one or more displays corresponding to the location, (v) receiving, at the system, user input, and (vi) sending, by the system to the vehicle, data based on the user input to cause the vehicle to take an action. In examples, if both the representation of the sensor data and the model are displayed, the feature may be indicated in both the representation of the sensor data and the model. In other examples, the feature may be indicated in only one view. For example, if the location of the feature is determined in the model, it may be displayed in the representation of the sensor data, and if the location of the feature is determined in the sensor data, it may be displayed in the model. In examples, the sensor data is video frame data, such as video frame data captured by a video camera. In other examples, the sensor data is captured by another sensor, rather than a video camera.

As mentioned, in examples, the location of the feature within the sensor data (such as the video frame data) or the model may be determined automatically, without requiring user input to select or generate the feature within the displayed sensor data view or model view. The user input may therefore be received after the indication of the feature is displayed. In some cases, the user input is received before the indication of the feature is displayed, but the user input may not necessarily be a user input selecting or generating the feature within the displayed sensor data view or model view. In some cases, a user input is received before the indication of the feature is displayed and a further user input is received after the indication of the feature is displayed.

In other examples however, the user input is associated with the feature and a first position on the one or more displays. For example, as discussed above, the user input may comprise a first user input at a first position on the one or more displays (such as within the displayed representation of the sensor data or within the displayed model). This first position may correspond to a location of the feature with the sensor data or the model (depending upon where the first position is), and based on the location, a corresponding position within the other of the displayed representation of the sensor data or the displayed model can be determined, as discussed earlier. Once this position has been determined, the indication of the feature can be displayed at the position on the one or more displays, where the position corresponds to the determined location, and is ultimately based on the first position indicated by the first user input from the operator.

More detailed examples of the system, as well as method(s) and computer-readable media of the present disclosure will now be presented, with reference to the accompanying figures.

FIG. 1 depicts an example implementation of the present disclosure. As shown, an autonomous vehicle 110 is located within an environment. In this example, the vehicle 110 is navigating throughout the environment at a particular speed, but in other examples, the vehicle 110 may be stationary. The vehicle comprises one or more sensors 112, which in this case includes at least one image sensor, such as a video camera 112, that captures images/frames of the environment and stores (at least temporarily) the recorded frames as video frame data. Other sensors 112 may capture other environmental data associated with the environment around the vehicle 110. For example, the other sensors 112 may include ultrasonic sensors to acoustically detect objects in the surroundings, lidar sensors, radar sensors, etc.

FIG. 1 depicts a view 116 of the environment as seen by an image sensor, such as the video camera 112. For example, within the field of view 116 there may be one or more moving (i.e., non-stationary) objects, such as one or more pedestrians, vehicles or cyclists, as well as one or more stationary objects, such as one or more parked or stopped vehicles, buildings, signs, etc.

A remote system 100 may be communicatively coupled to the vehicle 110 via one or more networks 114. Video frame data captured by the one or more video cameras 112, can be transmitted to the remote system 100 via the network 114. Accordingly, the vehicle 110 may comprise a network interface to enable data to be transmitted to the remote system 100. In this example, the network interface comprises a wireless antenna for sending the video frame data (and any other data, such as output data) to the remote system 100. A human operator 122 may monitor and/or control the vehicle 110 via the system 100.

Video frame data may include data associated with a frame of a recorded video, and is indicative of the environment around the vehicle. Video frame data may include data corresponding to pixels within the frame.

Although video frame data is discussed in the following examples, it will be appreciated the following discussion can apply equally to sensor data in general.

Environmental data captured by one or more sensors 112, may be processed by the vehicle 110 (such as by a perception component of the vehicle 110) to generate perception output data. The perception output data may be used by a planning component (discussed in more detail in FIG. 17) of the vehicle which determines instructions for controlling operation of the vehicle 110 based at least in part on the perception output data. The perception output data can be sent or otherwise transmitted to the remote system 100 via the network 114. The perception output data can be transmitted to the system 100 as output data, where the output data comprises at least the perception output data.

In some cases, the environmental data captured by the one or more sensors 112 may not be processed by the vehicle 110 to generate output data, and may instead be transmitted to the remote system 100. The system 100 may itself process the environmental data to generate output data and/or a model of the environment, in some cases in the same way or in a similar way as the vehicle would generate the perception, prediction, and/or planner data.

Figure 17:
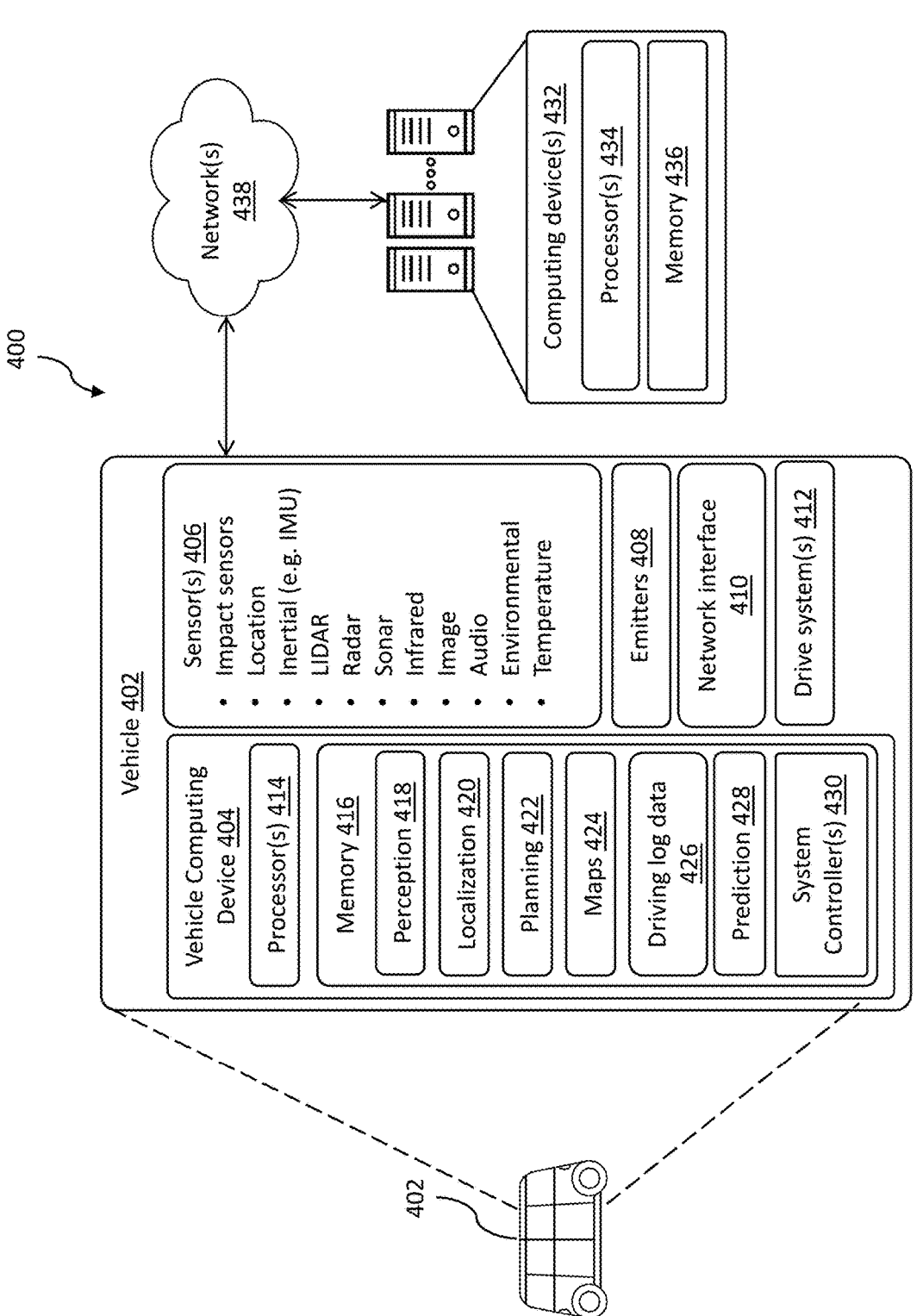
FIG. 17 is a block diagram of an example vehicle system.

The vehicle 110 may also determine or store prediction output data, where the prediction output data is generated by a prediction component of the vehicle 110 (discussed in more detail in FIG. 17). The prediction component may generate one or more probability maps representing prediction probabilities of possible locations of one or more features/objects in the environment. The prediction output data can be sent or otherwise transmitted to the remote system 100 via the network 114. The prediction output data can be transmitted to the system 100 as part of the output data.

The vehicle 110 may also determine or store map data, where the map data contains location information associated with one or more map features (such as roads, pavements, traffic lights, junctions, etc.). The map data can be sent or otherwise transmitted to the remote system 100 via the network 114. The map data can be transmitted to the system 100 as part of the output data. In examples, at least some of the map data is accessible by the system 100 without needing the map data to be sent by the vehicle 110 (or in addition to the map data being sent by the vehicle 110). The vehicle 110 may also determine route data, where the route data contains location information associated with one or more route features (such as a navigation path or corridor). The route data can be sent or otherwise transmitted to the remote system 100 via the network 114. The route data can be transmitted to the system 100 as part of the output data.

The system 100 comprises one or more processors 102 and one or more non-transitory computer readable media 104 having instructions stored thereon which, when executed by the one or more processors 102, cause the one or more processors 102 to perform particular operations, which will be discussed in more detail below.

Once the system 100 receives the output data, the system 100 can use the output data to generate a model, such as a graphical model, of the environment.

The system 100 may further comprise at least one display 106 (also known as a computer monitor) for displaying information to the operator 122. The system 100 may further comprise one or more input devices 120 to receive user input from the operator 122. For example, the user input may cause an instruction to be transmitted to the vehicle 110 via the network 114 which causes the vehicle 110 to perform an action, such as follow a particular navigation path through the environment. In an example, the one or more displays 106 are themselves input devices 120. For example, the one or more displays 106 may comprise a touch screen display 106 which can accept user input associated with a particular position on the display 106.

The information displayed or otherwise output on the one or more displays 106 can include a representation 108 of the video frame data. FIG. 1 depicts one of the one or more displays 106 displaying a representation 108 of the video frame data received from the vehicle 110. The one or more displays 106 can therefore output a representation 108 of the view 116 of the environment as seen by the video camera 112.

FIG. 1 also depicts one of the one or more displays 106 displaying a model 118 of the environment based on the output data that was received from the vehicle 110. In examples, the one or more displays 106 may display the representation 108 of the video frame data simultaneously with the model 118. For example, as shown in FIG. 1, one display 106 may display the representation 108 of the video frame data and another display 106 may display the model 118. In other cases, both the representation 108 of the video frame data and the model 118 may be displayed on the same display 106.

In other examples, the one or more displays 106 may display the representation 108 of the video frame data and the model at different times (and an operator may select between them, as required). In other examples, the one or more displays 106 may display only one of the model 118 or the representation 108 of the video frame data.

Although FIG. 1 shows the model 118 as a 2D representation of the environment, it will be appreciated that the model 118 may be a 3D representation of the environment.

In general, the one or more displays 106 may display the representation 108 of the video frame data in a particular area of a display 106 (referred to herein as a "first area") and the one or more displays 106 may display the model 118 in another area of a display 106 (referred to herein as a "second area").

In examples, when the vehicle 110 comprises two or more video cameras 112, and video frame data from two or more video cameras 112 is transmitted to the system 100, the one or more displays 106 may display representations of video frame data from the two or more video cameras 112. For example, two or more representations of the video frame data may be simultaneously displayed on the one or more displays 106, or the one or more displays 106 may display the representations at different times (and an operator may select between the two or more representations of the video frame data as required). In examples, the one or more displays 106 may display a representation of video frame data based on the video frame data captured by the two or more video cameras 112. For example, the video data captured by the two or more video cameras 112 may be combined/stitched together to provide a combined representation of the video frame data.

As previously discussed, while the one or more displays 106 are displaying at least one of the model 118 or the representation 108 of the video frame data, the operator 122 may provide a user input, such as via the one or more user input devices 120. For example, the user may "select" a feature displayed in the first area (i.e., within the representation 108 of the video frame data) or the second area (i.e., within the model 118), or may provide a user input to modify or generate a feature, such as a navigation path. The user input may be associated with a particular position, such as an x, y coordinate on the display within the area.

FIGS. 2-15 depict close ups of the output on the one or more displays 106 as viewed by the operator 122. It will be appreciated that the representation 108 of the video frame data may be displayed on one display 106, and the model 118 may be displayed on another display 106 (either at the same, or different times), or both the model 118 and the representation 108 of the video frame data may be displayed on the same display 106 (either at the same, or different times).

In any of the following examples, it will be appreciated that reference to user input being received in one view (i.e., within the representation 108 of the video frame data or the model 118) may equally apply to examples where the user input is received within the other view. Similarly, reference to an indication of a feature being displayed in one view, may equally apply to examples where the indication may be displayed in the other view. As such, the particular examples discussed herein may be reversed.

Figure 2:
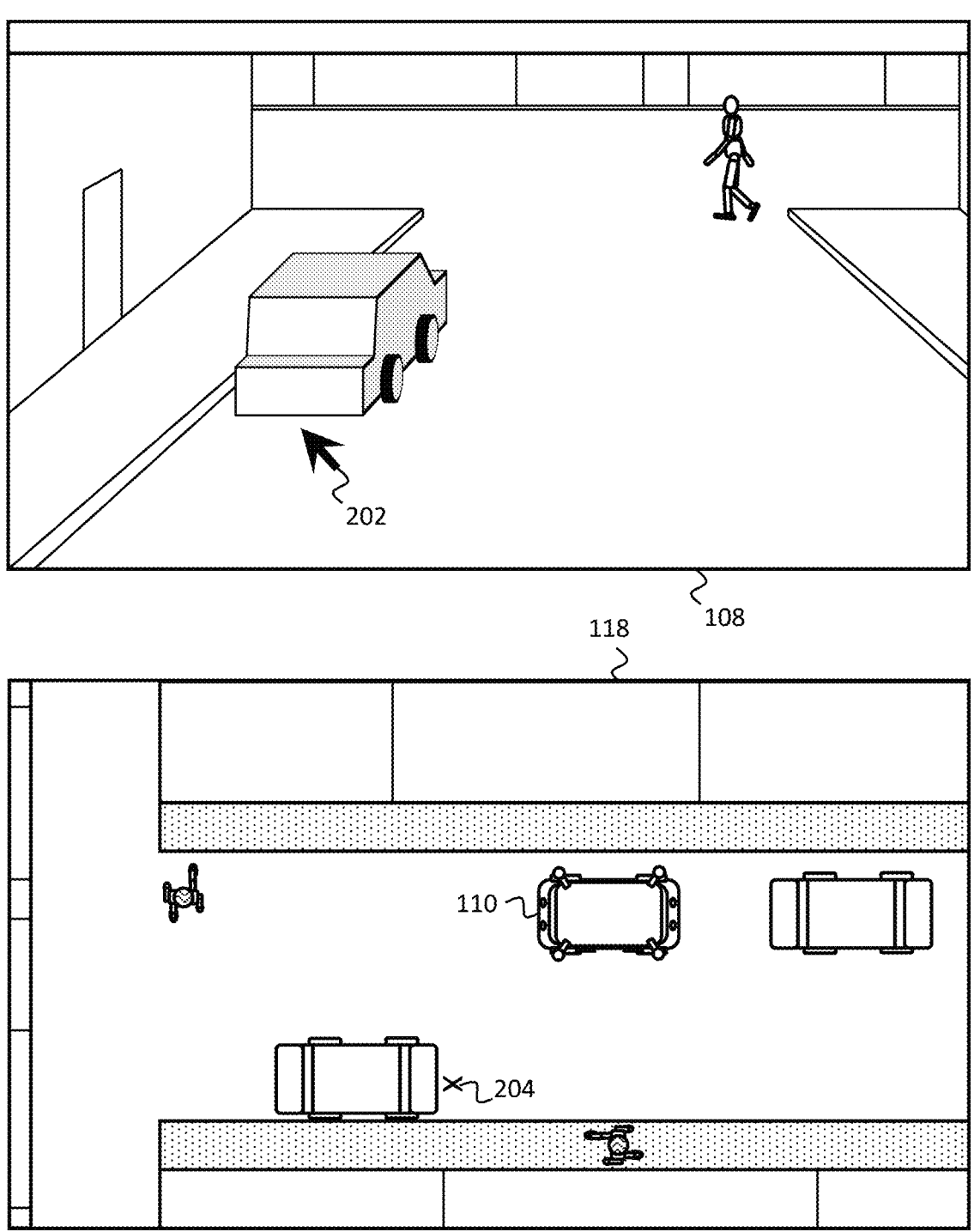
FIGS. 2-15 are pictorial diagrams of examples of outputs on one or more displays at the remote system.

FIG. 2 depicts a close up of the output on the one or more displays 106 as viewed by the operator 122 according to an example. As shown, the output on the one or more displays 106 includes the representation 108 of the video frame data. As also shown in FIG. 2, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

As shown in FIG. 2, the operator 122 may provide a user input (such as a first user input) via a user input device 120 by moving and clicking a pointer 202, such as mouse pointer, within a first area of the one or more displays 106 occupied by the representation 108 of the video frame data or within a second area of the one or more displays 106 occupied by the model 118. In other examples, a pointer 202 may not be present, for example, and user input may be received in another way, such as via a touch input on the one the one or more displays 106. In this particular example, the user input is provided within the first area of one or more displays 106 occupied by the representation 108 of the video frame data. For example, the operator may "click" or "touch" at a particular position on the one or more displays 106 within the first or second area (i.e., within the displayed representation 108 of the video frame data or the model 118). As mentioned, the user input may be associated with a feature that is already displayed in the particular area (i.e., within the representation 108 of the video frame data or the model 118). The position on the one or more displays 106 determined by the user input corresponds to a physical location within the environment. In this example, the feature associated with the user input corresponds to a particular location on the road, behind a vehicle.

In examples, the first area of the one or more displays 106 occupied by the representation 108 of the video frame data may be a first area on the one or more displays 106 having the same size as the representation 108 of the video frame data. For example, if the representation 108 of the video frame data is displayed on a display, and the representation 108 of the video frame data has a dimension of 500×300 pixels on the display, the first area has a dimension corresponding to 500×300 pixels. Accordingly, the first area on the display is occupied by the representation 108 of the video frame data (that is, pixels of the first area display the representation 108 of the video frame data). Other areas of the one or more displays 106 may display other information, such as the model 118. Similarly, the second area of the one or more displays 106 occupied by the model 118 may be a second area on the one or more displays 106 having the same size as the displayed model 118. For example, if the model 118 is displayed on a display, and the model 118 has a dimension of 500×300 pixels on the display, the second area has a dimension corresponding to 500×300 pixels. Accordingly, the second area on the display is occupied by the model 118 (that is, pixels of the second area display the model 118). Other areas of the one or more displays 106 may display other information, such as the representation 108 of the video frame data. In examples, the representation 108 of the video frame data and the model 118 have different perspectives. In other cases, they may be displayed to have the same perspective. In examples, both the representation 108 of the video frame data and the model 118 display the same objects/features. In some examples, the field of views may be such that one view displays a subset of the features displayed in the other view. For example, one feature may be out of the field of view of the camera, but may nevertheless be displayed in the model 118.

After the user input associated with a feature has been received, the one or more displays 106 may display in the other area (i.e., within the other of the representation 108 of the video frame data or the model 118) an indication of the feature at a particular position that corresponds to the same physical location in the environment. Accordingly, if the user input is received at a first position within the first area (i.e., within the representation 108 of the video frame data) or the second area (i.e., within the model 118), a second, corresponding, position within the other area can be determined. In examples, this can be achieved by: (i) determining a first position within the first area or the second area associated with the feature indicated by the user input (depending upon where the user input was received), and (ii) determining, based on the first position, a second position of the feature within the other of the first area or the second area. For example, each position in the first area may be mapped/converted to a corresponding position in the second area, where the corresponding positions correspond to the same physical location in the environment. A lookup table may be used to convert positions between the two areas.

In examples, determining the second position may be achieved by: (i) determining a first position within the first area or the second area associated with the feature (depending upon where the user input was received), (ii) determining a location associated with the feature within the environment based on the first position, and (iii) determining, based on the location, a second position of the feature within the other of the first area or the second area. For example, each position in the first and second areas may be mapped to a corresponding physical location within the environment. The locations within the environment may be associated with a coordinate system. The locations within the environment may be alternatively known as a location within the video frame data or model (where features within the video frame data and model are associated with a location).

The mapping or conversion of positions may be based on a calibration procedure, which may take into account the particular parameters of the video camera on the vehicle 110 (such as the lens distortion of the video camera), as well as the physical location and orientation of the video camera in 3D space. In some cases, one or more equations may be derived during the calibration feature, where inputting the first position into the equation outputs the second position in the other area on the display(s) 106 (or vice versa). In examples, determining, based on the first position, a second position of the feature within the other of the first area or the second area may be achieved by configuring a "virtual" camera in the model 118. For example, the virtual camera may have the same parameters (such as field of view), location in 3D space, orientation etc. as the "real" video camera. As such, whenever an input is received in the first or second areas, the position can be converted to a corresponding position in the other area, since each three-dimensional location in the environment (and therefore in the model 118) is mapped to a corresponding x, y position in the representation of the video frame data.

As such, in examples, each "pixel" in the first area is mapped to a corresponding location in 3D space (i.e., a location within the model). Once the location in the model is known, an indication can be displayed at the second position that corresponds to that location.

In examples where the user input is received in the first area, determining, based on the first position, a second position of the feature within the second area may be achieved by determining a location of a corresponding feature/object in the model 118, and determining the second position based on the location of the corresponding feature. Determining the location of the corresponding feature may comprise: (a) determining a vector within the field of view of the video camera, where the vector extends from the video camera (such as the centre of the field of view) to the first position, (b) determining, based on the vector, a feature within the model that lies along the vector (such as coincides with the vector), and (c) determining a location of that feature. Once the location of the feature is known, the second position of the feature within the second area can be determined and thereby indicated. The vector may be determined within 3D space (in the model) based on the known parameters of the video camera, mentioned above. For example, if the user "clicks" on a place on the road in the first area, a vector (e.g., a ray) can be determined that extends from the "virtual" camera towards a location in space that is represented by that pixel in the first area, and the feature that intersects the vector (in this case the road surface) is determined to be at the corresponding location that the user clicked on. For example, a depth of a feature (such as a road surface) may be determined by a sensor system using sensor fusion and/or use of depth sensors (e.g., lidar, radar, ToF). In some example depth data may be fused from such sensors directly into image space and used to determine a corresponding location of feature selected by a user in space using depth interpolation, segmentation, and/or other techniques.

In examples where the user input is received in the second area, determining, based on the first position, a second position of the feature within the first area may be achieved by: (a) determining a location in 3D space (i.e., in the model) based on the first position, and determining the second position based on the location. This process may again make use of the calibration procedure or virtual camera discussed above.

In other examples, determining, based on the first position, a second position of the feature within the other of the first area or the second area may be achieved by determining, based on the first position, an object nearest the first position, and determining in the other area, the same corresponding object, where the corresponding object is displayed at a second position. For example, if the first position is on or near to a car in the video frame view, the corresponding car may be located in the model.

In a further example, the video frame data may be associated with a first coordinate system and the model (and therefore the output data) may be associated with a second coordinate system. Accordingly, determining the second position may be achieved by: (i) determining a first position within the first area or the second area associated with the feature (depending upon where the user input was received), (ii) determining a first location of the feature within the first or second coordinate system, based on the first position, and (iii) determining a second location of the feature within the other of the first or second coordinate system by converting between the first and second coordinate systems, and (iv) determining the second position based on the second location. The location within the first coordinate system may be alternatively known as a location within the video frame data. Similarly, the location within the second coordinate system may be alternatively known as a location within the model.

After the second position has been determined, the one or more displays 106 can display an indication 204 of the feature at the second position. In the example of FIG. 2, because the user input was received in the first area (i.e., within the representation 108 of the video frame data), the second position corresponds to a position in the second area (i.e., within the model 118). FIG. 2, therefore shows an indication 204 of the feature, in this case a marker in the form of an "x", displayed within the model 118 at the second position. The indication 204 is therefore displayed at a location corresponding to the same feature in the environment, in this case at a location on the road, behind the vehicle. The operator 122 viewing the model 118 can therefore see where in the model 118 the same feature is located. The operator 112 can therefore more easily associate corresponding features between the two views 108, 118.

In some examples, in addition to displaying the indication 204, the area in which the indication 204 is displayed may also be adjusted on the display. For example, the model 118 or the representation of video frame data may adjusted to "zoom in" on the feature (or more generally the field of view may be adjusted to focus on the feature), to depict the feature more clearly to the operator.

Data may be sent or otherwise transmitted from the system 100 to the vehicle 110 after, simultaneously with, or before the one or more displays 106 display an indication 204 of the feature at the second position. The data may be based on user input, and causes the vehicle 110 to take an action, such as proceed or behave in a particular way. The data received from the system may be provided to the planning component of the vehicle for processing. For example, the operator 122 may provide a driving instruction for the vehicle 110, may classify a feature/object, provide confirmation to the vehicle 110, if the vehicle 110 has asked the operator for confirmation, such as "proceed?", "OK to go?", "is this feature/object a pedestrian?", etc. In examples, the data sent by the system 100 to the vehicle 110 may comprise a location of the feature within the environment (where the location may be determined based on the first position) or may comprise some other data associated with the feature, to allow the vehicle 110 to determine the location of the feature itself.

Figure 3:
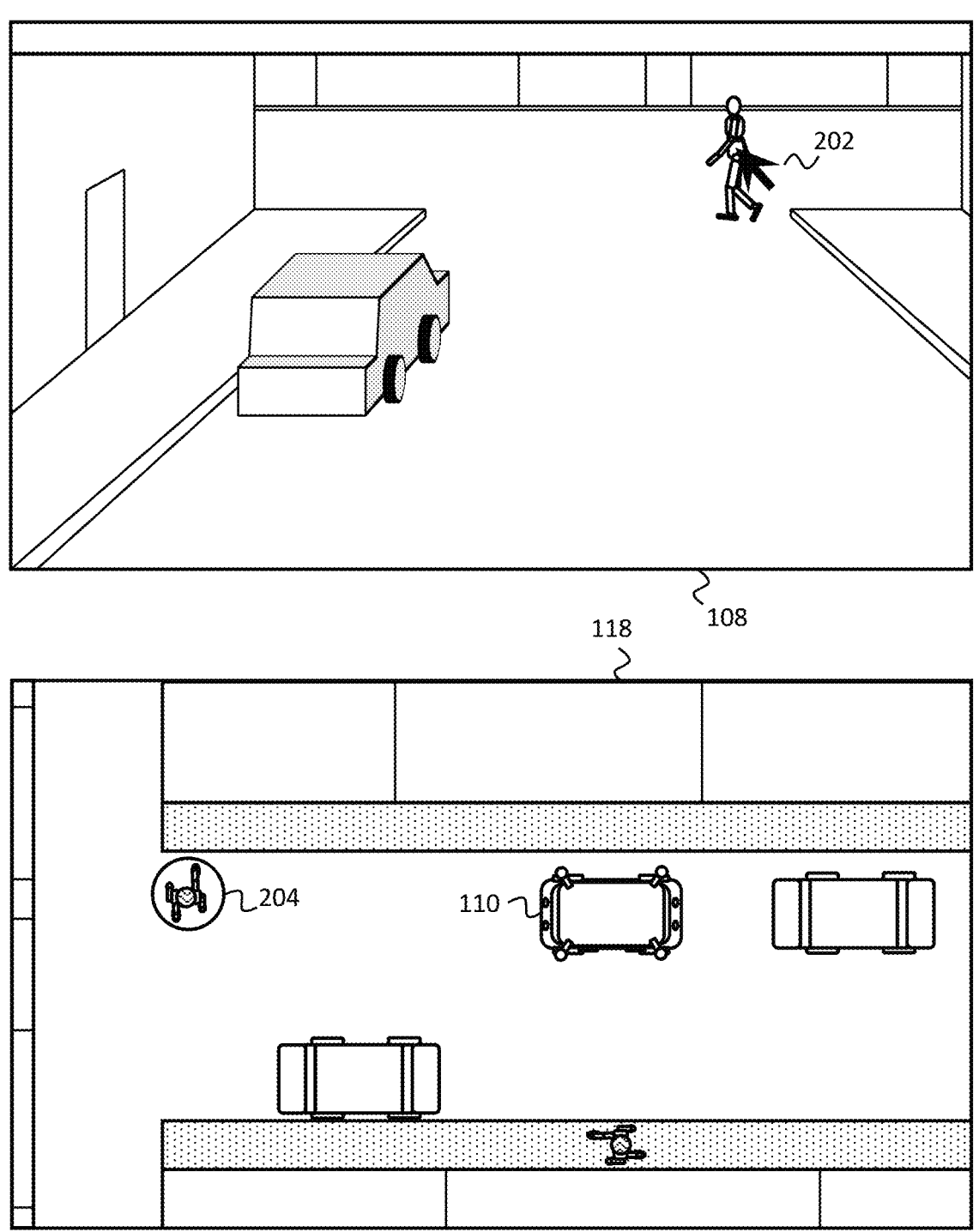

FIG. 3 depicts a close up of the output on the one or more displays 106 as viewed by the operator 122, according to another example. As shown, the output on the one or more displays 106 includes the representation 108 of the video frame data. As also shown in FIG. 3, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

As shown in FIG. 3, the operator 122 may provide a user input (such as a first user input) via a user input device 120 by moving and clicking a pointer 202, such as mouse pointer, within a first area of the one or more displays 106 occupied by the representation 108 of the video frame data or within a second area of the one or more displays 106 occupied by the model 118. In other examples, a pointer 202 may not be present, for example, and user input may be received in another way, such as via a touch input on the one the one or more displays 106. In this particular example, the user input is provided within the first area of one or more displays 106 occupied by the representation 108 of the video frame data. For example, the operator may "click" or "touch" at a particular position on the one or more displays 106. As mentioned, the user input may be associated with a feature that is already displayed in the particular area (i.e., within the representation 108 of the video frame data or the model 118). The position on the one or more displays 106 determined by the user input corresponds to a physical location within the environment. In this example, the feature associated with the user input corresponds to a pedestrian.

After the user input associated with a feature has been received, the one or more displays 106 may display in the other area (i.e., within the other of the representation 108 of the video frame data or the model 118) an indication of the feature at a particular position that corresponds to the same physical location in the environment. Accordingly, if the user input is received at a first position within the first area (i.e., within the representation 108 of the video frame data) or the second area (i.e., within the model 118), a second, corresponding, position within the other area can be determined. Examples of how this may be achieved are discussed in relation to FIG. 2, so will not be repeated here again for brevity.

After the second position has been determined, the one or more displays 106 can display an indication 204 of the feature at the second position. In the example of FIG. 3, because the user input was received in the first area (i.e., within the representation 108 of the video frame data), the second position corresponds to a position in the second area (i.e., within the model 118). FIG. 3, therefore shows an indication 204 of the feature, in this case a marker in the form of circle surrounding the corresponding feature displayed within the model 118. The indication 204 is therefore displayed at a location corresponding to the same feature in the environment.

It will be appreciated that displaying an indication of a feature at the second position may not necessarily require the indication to occupy a pixel corresponding exactly to the second position, but instead may generally indicate the second position. For example, in this example, the indication 204 in the form of a circle may be generally indicate the second position, perhaps by being centered on the second position. Other examples are possible.

Data may be sent or otherwise transmitted from the system 100 to the vehicle 110 after, simultaneously with, or before the one or more displays 106 display an indication 204 of the feature at the second position. The data may be based on user input, and causes the vehicle 110 to take an action, such as proceed or behave in a particular way. The data received from the system may be provided to the planning component of the vehicle for processing. For example, the operator 122 may provide a driving instruction for the vehicle 110, or may classify a feature/object, or may provide confirmation to the vehicle 110, if the vehicle 110 has asked the operator for confirmation, such as "proceed?", "OK to go?", "is this feature/object a pedestrian?", etc. In examples, the data sent by the system 100 to the vehicle 110 may comprise a location of the feature within the environment (where the location may be determined based on the first position) or may comprise some other data associated with the feature, to allow the vehicle 110 to determine the location of the feature itself. Examples of commands to be sent to a vehicle are found in the patent application Ser. No. 17/463,431 titled "COLLABORATIVE ACTION AMBIGUITY RESOLUTION FOR AUTONOMOUS VEHICLES" and filed on Aug. 31, 2021, which is hereby incorporated by reference in its entirety and for all purposes.

Figure 4:
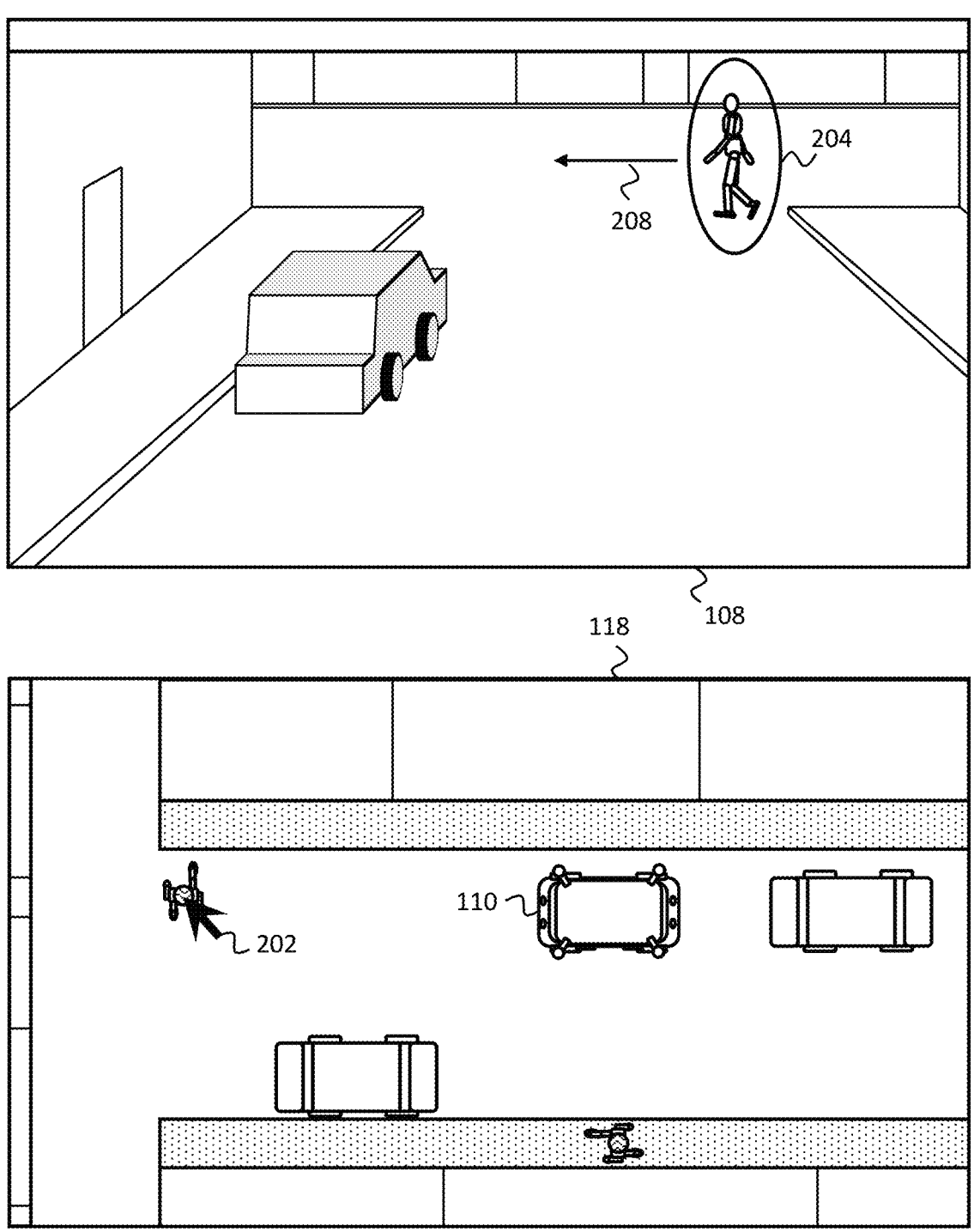

FIG. 4 depicts an example similar to that of FIG. 3, but instead of the operator 122 providing a user input (such as a first user input) within the first area of the one or more displays 106 occupied by the representation 108 of the video frame data, the user input is received within the second area of the one or more displays 106 occupied by the model 118. Accordingly, the indication 204 of the feature is displayed in the first area, rather than the second area, as in FIG. 3.

In some examples, in addition to or instead of the indication 204, an indication 208 of a predicted path associated with the feature/object may displayed. For example, the operator 122 may click on a pedestrian in the second area, which causes a predicted path associated with the pedestrian to be overlayed in the first area (or vice versa). The first user input therefore corresponds to a selection of an object visible in one of the representation 108 of the video frame data or the model 108 and the feature therefore corresponds to a predicted path associated with the object in the environment.

In any of the examples discussed above or in the examples discussed herein, the operator 122 may provide a second user input to provide a driving instruction for the vehicle, where the first user input corresponds to the selection of the feature, as discussed above. Accordingly, receiving the user input may comprise receiving at least a first user input and a second user input, the first user input being associated with the first position within one of the first area or the second area of the one or more displays 106, and the second user input corresponding to a driving instruction for the vehicle. The data sent by the system 100 to the vehicle 110 may therefore comprise the driving instruction that the vehicle uses to navigate in the environment. In examples, the data sent by the system 100 to the vehicle 110 may further comprise a location of the feature within the environment (where the location may be determined based on the first position). In this way, the vehicle 110 may apply the driving instruction based on the location. For example, the vehicle may stop before that location, ignore that location or navigate around that location. In some cases, the vehicle 110 may apply the driving instruction without needing to receive a location of the feature. For example, the vehicle 110 may apply the instruction based on its own location information associated with that feature, or may apply the instruction instantly, without use of location information.

Figure 5:
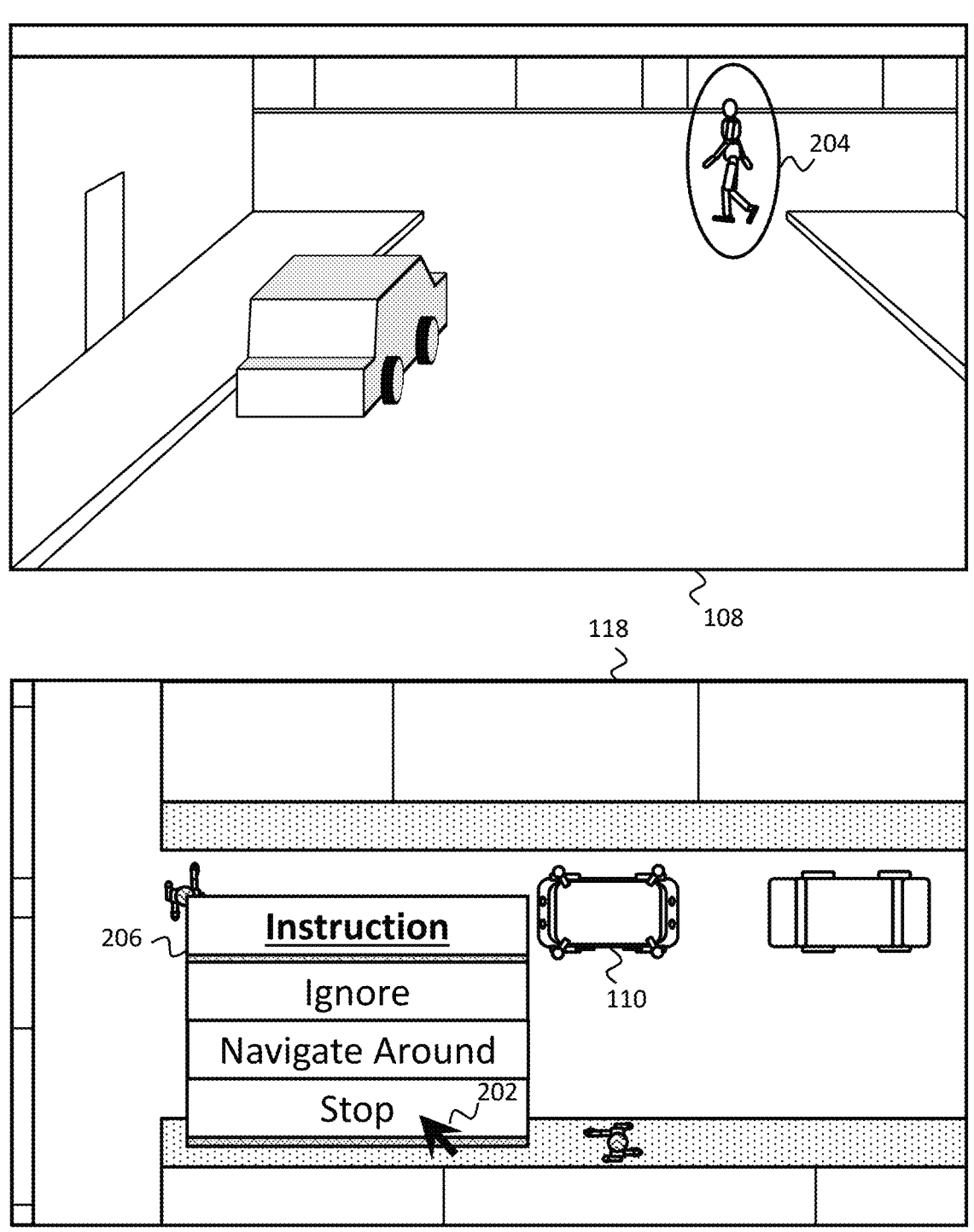

FIG. 5 depicts an example of how the operator 122 may proceed to provide a driving instruction for the vehicle after having provided a first user input. For example, following on from FIG. 4, a prompt 206, such as a graphical menu, may be displayed. In some cases, the prompt 206 may be displayed in response to receiving the first user input (i.e., the selection of the feature, in this case the pedestrian). In other cases, the prompt 206 may be displayed in response to receiving a further user input.

As shown in FIG. 5, after the prompt 206 has been displayed, the operator 122 may provide a user input (such as a second user input) via a user input device 120 by moving the pointer 202 and selecting a driving instruction. In this example, the operator 122 selects one or the displayed options in the prompt 206, thereby selecting a driving instruction. In this example, the driving instruction corresponds to "stop".

In other cases, a prompt is not displayed, and a user input indicative of the driving instruction may be provided in another manner, such as by a spoken or typed command. Other examples are possible. U.S. patent application Ser. No. 16/852,116, titled "Teleoperations For Collaborative Vehicle Guidance" filed on 17 Apr. 2020, which is incorporated in its entirety herein for all purposes, describes a vehicle determining a trajectory to navigate in the environment based on a driving instruction received from an operator.

Figure 6:
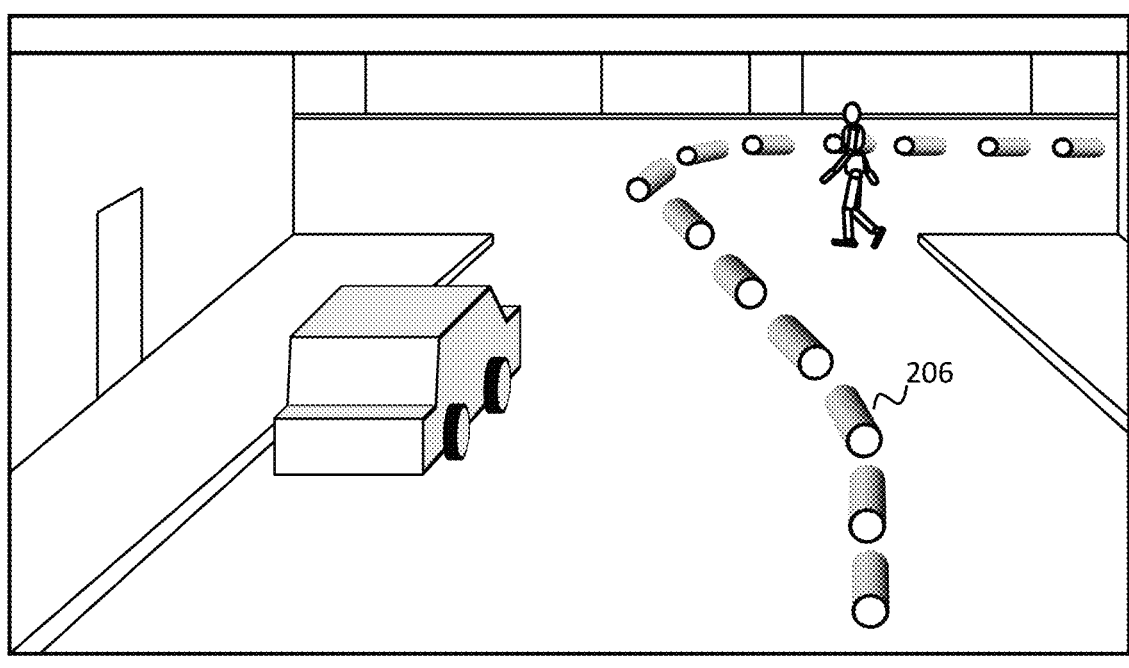
Figure 6:
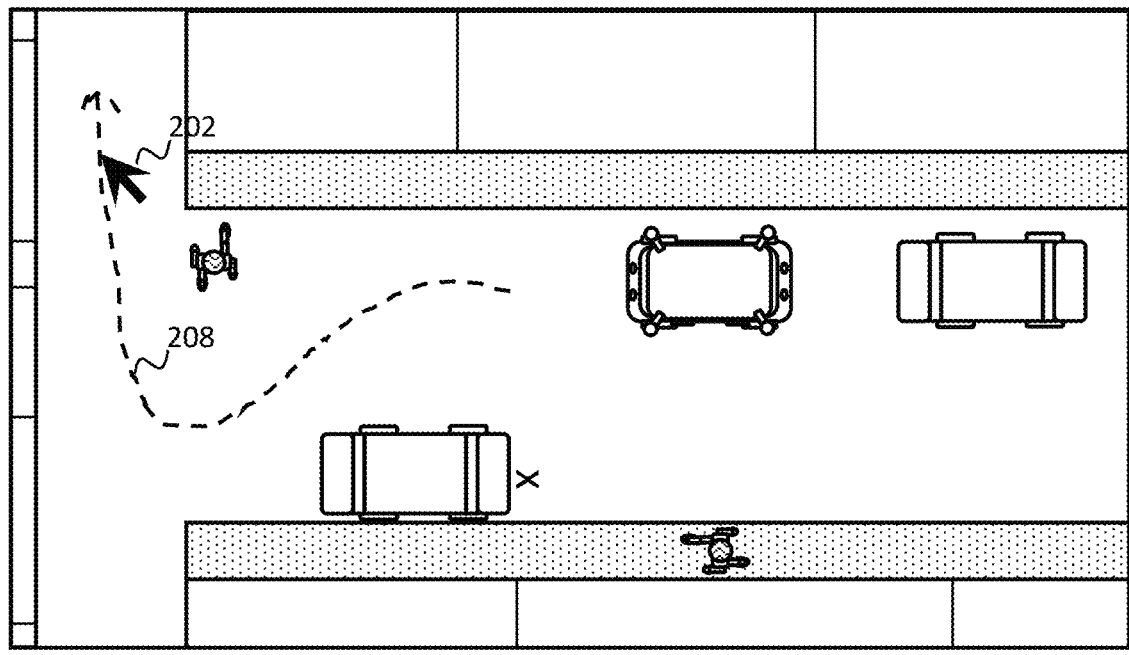

FIG. 6 depicts a close up of the output on the one or more displays 106 as viewed by the operator 122 according to another example. As shown, the output on the one or more displays 106 includes the representation 108 of the video frame data. As also shown in FIG. 6, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

As shown in FIG. 6, the operator 122 may provide a user input (such as one or more user inputs) via a user input device 120 by moving and clicking a pointer 202, such as mouse pointer, within a first area of the one or more displays 106 occupied by the representation 108 of the video frame data or within a second area of the one or more displays 106 occupied by the model 118. In other examples, a pointer 202 may not be present, for example, and user input may be received in another way, such as via touch input on the one the one or more displays 106. In this particular example, the user input is provided within the second area of one or more displays 106 occupied by the model 118. For example, the operator may "click" or "touch" or "drag" at one or more particular positions on the one or more displays 106. As mentioned, the user input may be associated with a feature that is not yet displayed in the particular area (i.e., within the representation 108 of the video frame data or the model 118). For example, the user input may comprise user input corresponding to generating a navigation path 208 for the vehicle 110. The navigation path may be associated with one or more driving instructions for the vehicle 110, such as instructions to follow a particular route, path or trajectory through the environment. In some cases, an existing navigation path may already be displayed in the particular area. The user input may therefore comprise user input corresponding to modifying an existing navigation path 208 for the vehicle 110. For example, points along the navigation path may be relocated or the navigation path may be extended or shortened.

In this example, the feature associated with the user input therefore corresponds to a navigation path, rather than an existing feature within the environment, as in the example of FIGS. 2-5.

The navigation path 208 as modified or generated by the user input may be associated with one or more positions on the one or more displays 106 as determined by the user input. Each position corresponds to a physical location within the environment.

After the user input associated with the navigation path 208 has been received, the one or more displays 106 may display in the other area (i.e., within the other of the representation 108 of the video frame data or the model 118) an indication of the navigation path at one or more particular positions that correspond to the same physical location(s) in the environment. Accordingly, if the user input is received at least a first position within the first area (i.e., within the representation 108 of the video frame data) or the second area (i.e., within the model 118), at least a second, corresponding, position within the other area can be determined. Examples of how this may be achieved are discussed in relation to FIG. 2, so will not be repeated here again for brevity.

After the corresponding second position(s) has/have been determined, the one or more displays 106 can display an indication 204 of the feature at the corresponding second position(s). In the example of FIG. 6, because the user input was received in the second area (i.e., within the model 118), the second position corresponds to a position in the first area (i.e., within the representation 108 of the video frame data). FIG. 6, therefore shows an indication 204 of the navigation path displayed within the representation 108 of the video frame data at at least the second position. The operator 122 viewing the model 118 can therefore see the navigation path in the representation 108 of the video frame data 118. The operator 112 can therefore see whether the navigation path is suitable.

Data may be sent or otherwise transmitted from the system 100 to the vehicle 110 after, simultaneously with, or before the one or more displays 106 display an indication 204 of the navigation path at the second position(s). The data may be based on user input, and causes the vehicle 110 to take an action, such as proceed or behave in a particular way. The data received from the system may be provided to the planning component of the vehicle for processing. In this case, the data sent by the system 100 to the vehicle 110 comprises data associated with the navigation path for the vehicle 110 to follow the navigation path.

In examples, the data associated with the navigation path sent by the system 100 to the vehicle 110 may comprise one or more locations within the environment associated with the navigation path (where the location(s) may be determined based on the user input). In examples, the data associated with the navigation path sent by the system 100 to the vehicle 110 may comprise one or more driving instructions, such as: "travel forward for 5 m", "turn left", "proceed to next junction", etc., rather than, or in addition to, one or more locations within the environment associated with the navigation path.

Figure 7:
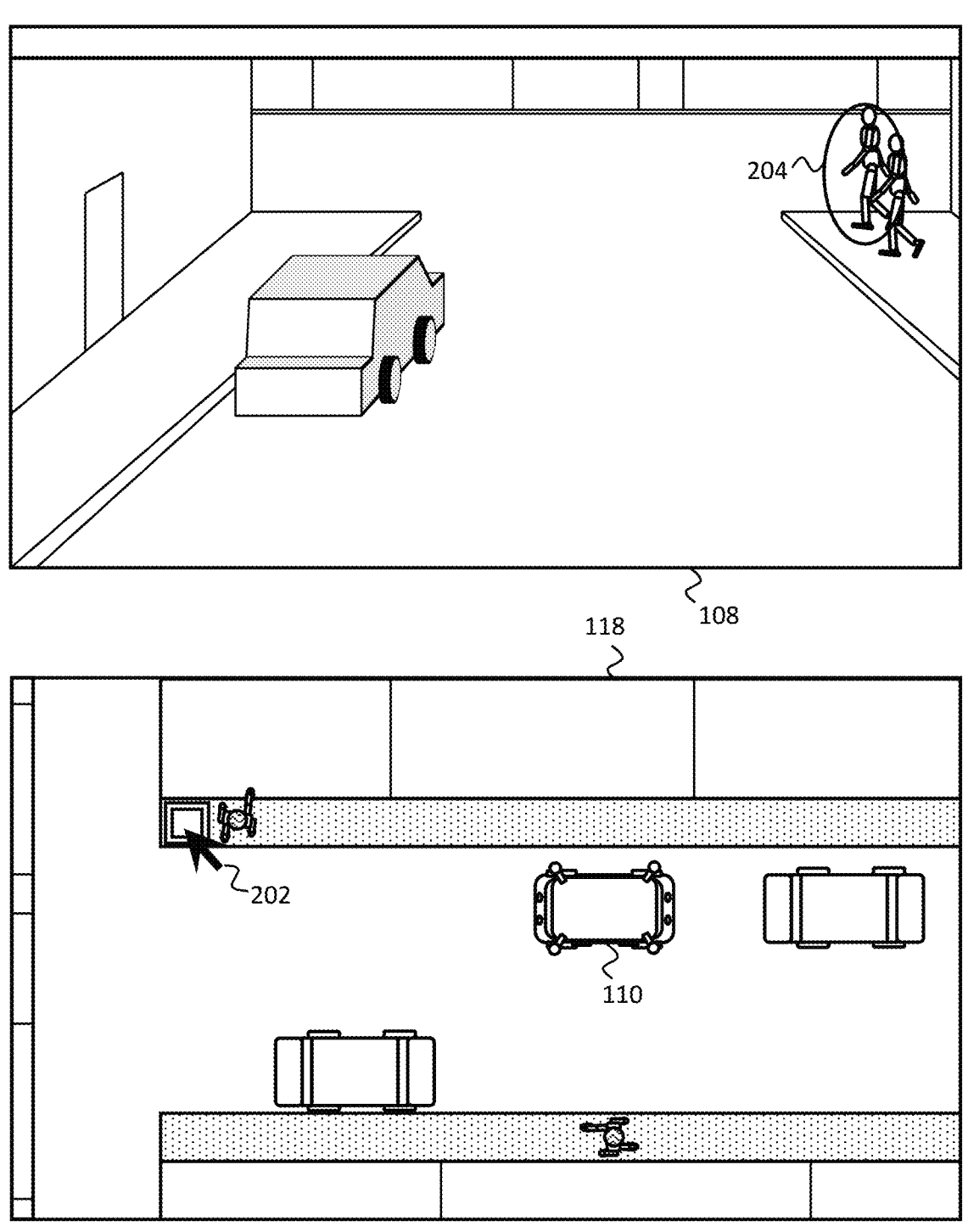

FIG. 7 depicts a close up of the output on the one or more displays 106 as viewed by the operator 122, according to another example. As shown, the output on the one or more displays 106 includes the representation 108 of the video frame data. As also shown in FIG. 7, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

As shown in FIG. 7, the operator 122 may provide a user input (such as a first user input) via a user input device 120 by moving and clicking a pointer 202, such as mouse pointer, within a first area of the one or more displays 106 occupied by the representation 108 of the video frame data or within a second area of the one or more displays 106 occupied by the model 118. In other examples, a pointer 202 may not be present, for example, and user input may be received in another way, such as via a touch input on the one the one or more displays 106. In this particular example, the user input is provided within the second area of one or more displays 106 occupied by the model 118. For example, the operator may "click" or "touch" at a particular position on the one or more displays 106. As mentioned, the user input may be associated with a feature that is already displayed in the particular area (i.e., within the representation 108 of the video frame data or the model 118). The position on the one or more displays 106 determined by the user input corresponds to a physical location within the environment. In this example, the feature associated with the user input corresponds to a mailbox (as is depicted in the model 118), despite the feature actually corresponding to a pedestrian (as seen in the representation 108 of the video frame data).

As such, in this example, the vehicle 110 may have incorrectly classified an object/feature (i.e., the pedestrian) as another object/feature (i.e., a mailbox). In such cases, the operator 122 may therefore provide user input to classify or re-classify a particular feature/object, which is then sent to the vehicle 110.

After the user input associated with the feature has been received, the one or more displays 106 may display in the other area (i.e., within the other of the representation 108 of the video frame data or the model 118) an indication of the feature at a particular position that corresponds to the same physical location in the environment. Accordingly, if the user input is received at a first position within the first area (i.e., within the representation 108 of the video frame data) or the second area (i.e., within the model 118), a second, corresponding, position within the other area can be determined. Examples of how this may be achieved are discussed in relation to FIG. 2, so will not be repeated here again for brevity.

After the second position has been determined, the one or more displays 106 can display an indication 204 of the feature at the second position. In the example of FIG. 7, because the user input was received in the second area (i.e., within the model 118), the second position corresponds to a position in the first area (i.e., within the representation 108 of the video frame data). FIG. 7, therefore shows an indication 204 of the feature, in this case a marker in the form of circle surrounding the corresponding feature displayed within the representation 108 of the video frame data. It will be appreciated that displaying an indication of a feature at the second position may not necessarily require the indication to occupy a pixel corresponding exactly to the second position, but instead may generally indicate the second position. For example, in this example, the indication 204 in the form of a circle may be generally indicate the second position, perhaps by being centered on the second position. Other examples are possible.

Data may be sent or otherwise transmitted from the system 100 to the vehicle 110 after, simultaneously with, or before the one or more displays 106 display an indication 204 of the feature at the second position. The data may be based on user input, and causes the vehicle 110 to take an action, such as proceed or behave in a particular way. The data received from the system may be provided to the planning component of the vehicle for processing. In this case, the data sent by the system 100 to the vehicle 110 comprises a classification of the feature/object provided by a user input.

Accordingly, in any of the examples discussed above or in the examples discussed herein, the operator 122 may provide a second user input to provide a classification for the feature, where the first user input corresponds to the selection of the feature, as discussed above. Accordingly, receiving the user input may comprise receiving at least a first user input and a second user input, the first user input being associated with the first position within one of the first area or the second area of the one or more displays 106, and the second user input corresponding to a classification of the feature. The data sent by the system 100 to the vehicle 110 may therefore comprise the classification. In examples, the data sent by the system 100 to the vehicle 110 may further comprise a location of the feature within the environment (where the location may be determined based on the first position). In this way, the vehicle 110 may act upon the classification based on the location. For example, the vehicle may behave in a particular way, given the classification of the object. In some cases, the vehicle 110 may receive the classification without needing to receive a location of the feature. For example, the vehicle 110 may determine a location of the feature based on its own location information associated with that feature.

Figure 8:
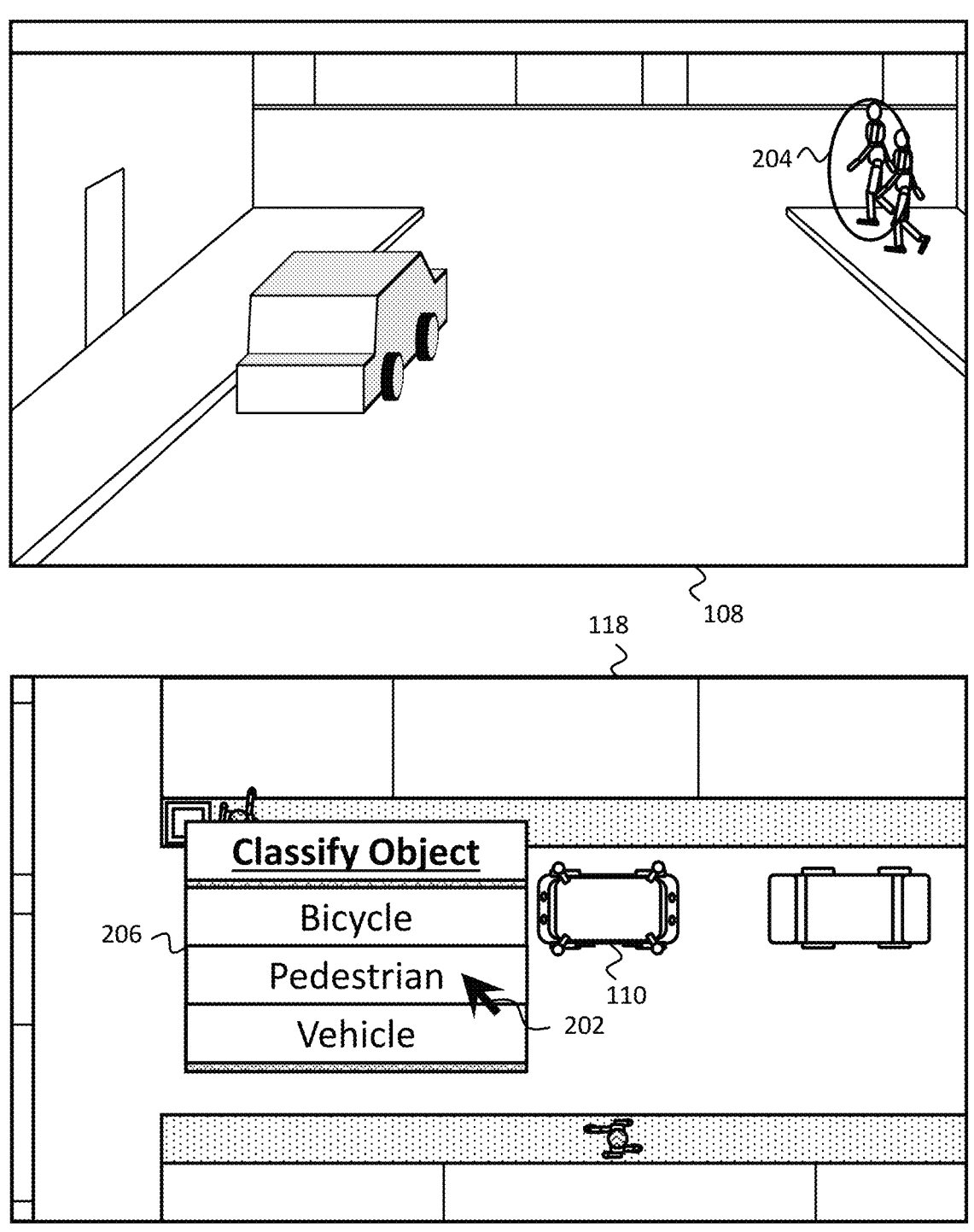

FIG. 8 depicts an example of how the operator 122 may proceed to provide a classification for the feature after having provided a first user input. For example, following on from FIG. 7, a prompt 206, such as a graphical menu, may be displayed. In some cases, the prompt 206 may be displayed in response to receiving the first user input (i.e., the selection of the feature, in this case the pedestrian). In other cases, the prompt 206 may be displayed in response to receiving a further user input.

As shown in FIG. 8, after the prompt 206 has been displayed, the operator 122 may provide a user input (such as a second user input) via a user input device 120 by moving the pointer 202 and selecting a classification. In this example, the operator 122 selects one or the displayed options in the prompt 206, thereby selecting a classification. In this example, the classification corresponds to "pedestrian".

In other cases, a prompt is not displayed, and a user input indicative of the classification may be provided in another manner, such as by a spoken or typed command. Other examples are possible.

Figure 9:
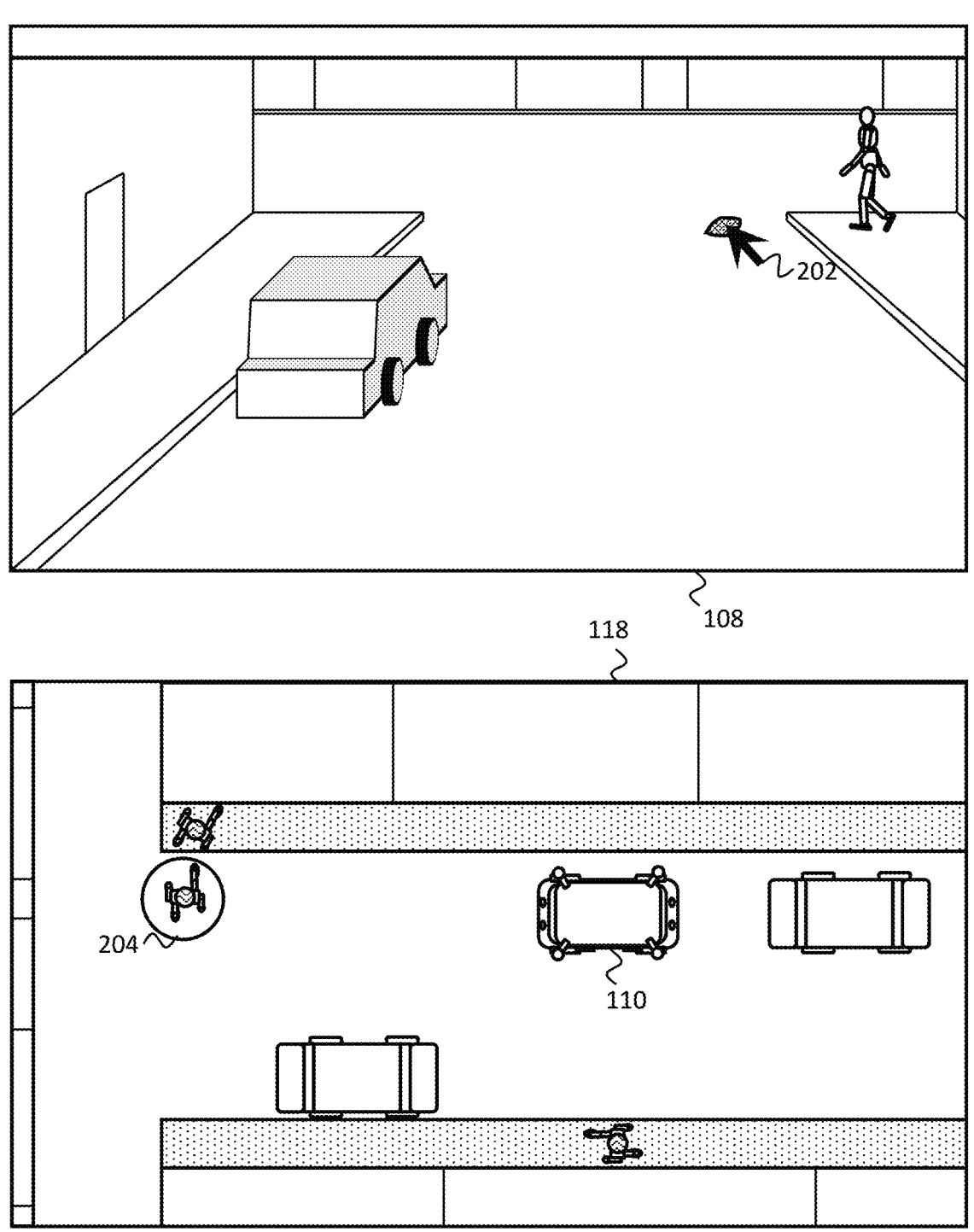

In examples, the vehicle 110 may have incorrectly classified an object/feature, and the operator 122 provides a user input indicative of a driving instruction (rather than, or in addition to providing a classification of the feature). FIG. 9 therefore depicts a close up of the output on the one or more displays 106 as viewed by the operator 122, according to another example. As shown, the output on the one or more displays 106 includes the representation 108 of the video frame data. As also shown in FIG. 9, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

As shown in FIG. 9, the operator 122 may provide a user input (such as a first user input) via a user input device 120 by moving and clicking a pointer 202, such as mouse pointer, within a first area of the one or more displays 106 occupied by the representation 108 of the video frame data or within a second area of the one or more displays 106 occupied by the model 118. In other examples, a pointer 202 may not be present, for example, and user input may be received in another way, such as via a touch input on the one the one or more displays 106. In this particular example, the user input is provided within the first area of one or more displays 106 occupied by the representation 108 of the video frame data. For example, the operator may "click" or "touch" at a particular position on the one or more displays 106. As mentioned, the user input may be associated with a feature that is already displayed in the particular area (i.e., within the representation 108 of the video frame data or the model 118). The position on the one or more displays 106 determined by the user input corresponds to a physical location within the environment. In this example, the feature associated with the user input corresponds to litter, or some other item (as seen in the representation 108 of the video frame data) despite the feature being depicted as a pedestrian in the model 118.

As such, in this example, the vehicle 110 may have incorrectly classified an object/feature (i.e., the litter) as another object/feature (i.e., a pedestrian). In such cases, the operator 122 may therefore provide user input to provide a driving instruction for the object that has been incorrectly classified, which is then sent to the vehicle 110.

After the user input associated with the feature has been received, the one or more displays 106 may display in the other area (i.e., within the other of the representation 108 of the video frame data or the model 118) an indication of the feature at a particular position that corresponds to the same physical location in the environment. Accordingly, if the user input is received at a first position within the first area (i.e., within the representation 108 of the video frame data) or the second area (i.e., within the model 118), a second, corresponding, position within the other area can be determined. Examples of how this may be achieved are discussed in relation to FIG. 2, so will not be repeated here again for brevity.

After the second position has been determined, the one or more displays 106 can display an indication 204 of the feature at the second position. In the example of FIG. 9, because the user input was received in the first area (i.e., within the representation 108 of the video frame data), the second position corresponds to a position in the second area (i.e., within the model 118). FIG. 9, therefore shows an indication 204 of the feature, in this case a marker in the form of circle surrounding the corresponding feature displayed within the model 118. It will be appreciated that displaying an indication of a feature at the second position may not necessarily require the indication to occupy a pixel corresponding exactly to the second position, but instead may generally indicate the second position. For example, in this example, the indication 204 in the form of a circle may be generally indicate the second position, perhaps by being centered on the second position. Other examples are possible.

Data may be sent or otherwise transmitted from the system 100 to the vehicle 110 after, simultaneously with, or before the one or more displays 106 display an indication 204 of the feature at the second position. The data may be based on user input, and causes the vehicle 110 to take an action, such as proceed or behave in a particular way. The data received from the system may be provided to the planning component of the vehicle for processing. In this case, the data sent by the system 100 to the vehicle 110 comprises a driving instruction provided by a user input. In examples, the data further comprises a classification of the feature/object provided by a user input.

Accordingly, as discussed in relation to FIGS. 4 and 5, receiving the user input may comprise receiving at least a first user input and a second user input, the first user input being associated with the first position within one of the first area or the second area of the one or more displays 106, and the second user input corresponding to a driving instruction for the vehicle. The data sent by the system 100 to the vehicle 110 may therefore comprise the driving instruction that the vehicle uses to navigate in the environment. In examples, the data sent by the system 100 to the vehicle 110 may further comprise a location of the feature within the environment (where the location may be determined based on the first position). In this way, the vehicle 110 may apply the driving instruction based on the location. For example, the vehicle may stop before that location, ignore that location or navigate around that location. In some cases, the vehicle 110 may apply the driving instruction without needing to receive a location of the feature. For example, the vehicle 110 may apply the instruction based on its own location information associated with that feature, or may apply the instruction instantly, without use of location information.

Figure 10:
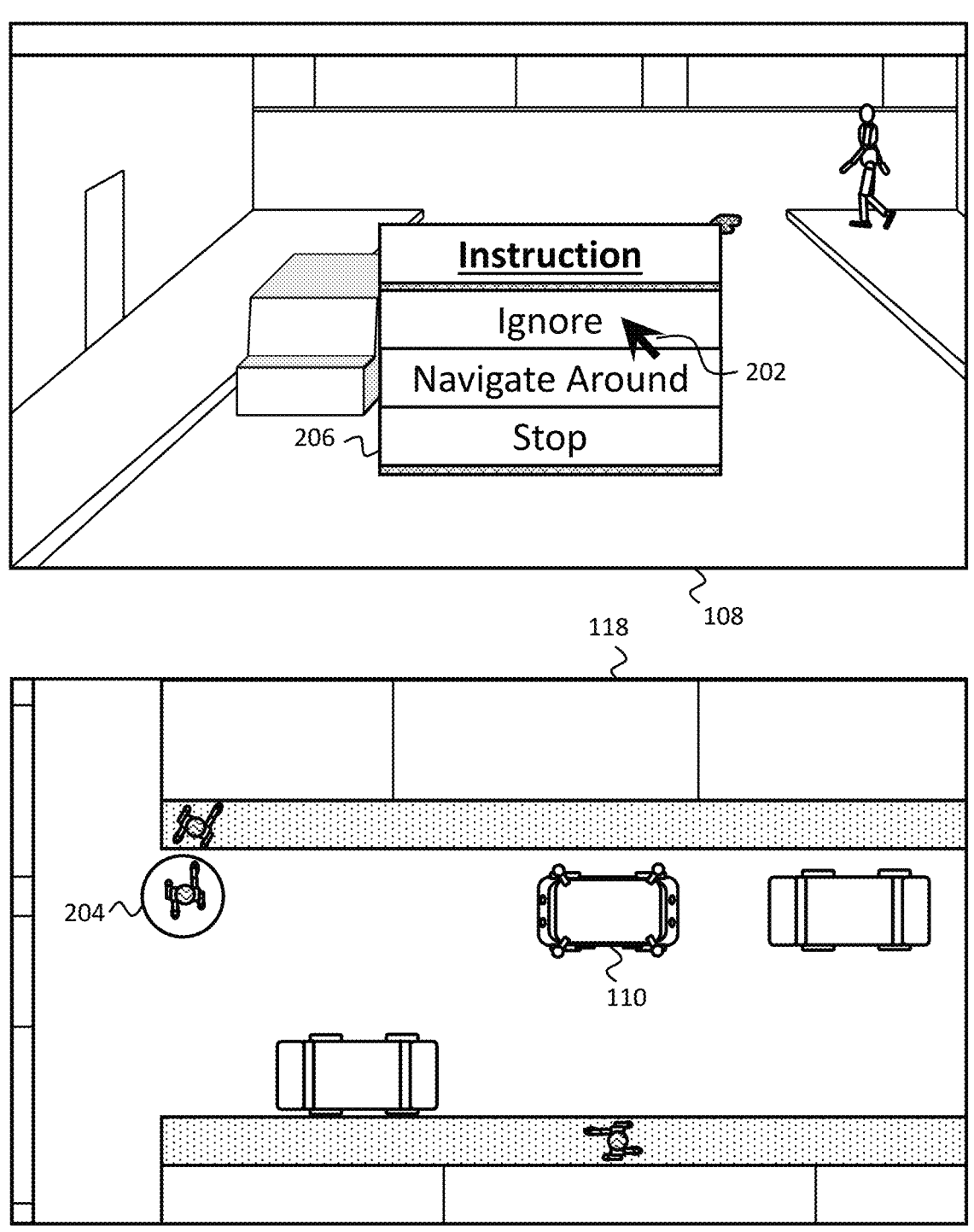

FIG. 10 depicts an example of how the operator 122 may proceed to provide a driving instruction for the vehicle after having provided a first user input. For example, following on from FIG. 9, a prompt 206, such as a graphical menu, may be displayed. In some cases, the prompt 206 may be displayed in response to receiving the first user input (i.e., the selection of the feature, in this case the pedestrian). In other cases, the prompt 206 may be displayed in response to receiving a further user input.

As shown in FIG. 10, after the prompt 206 has been displayed, the operator 122 may provide a user input (such as a second user input) via a user input device 120 by moving the pointer 202 and selecting a driving instruction. In this example, the operator 122 selects one or the displayed options in the prompt 206, thereby selecting a driving instruction. In this example, the driving instruction corresponds to "ignore".

In other cases, a prompt is not displayed, and a user input indicative of the driving instruction may be provided in another manner, such as by a spoken or typed command. Other examples are possible.

Figure 11:
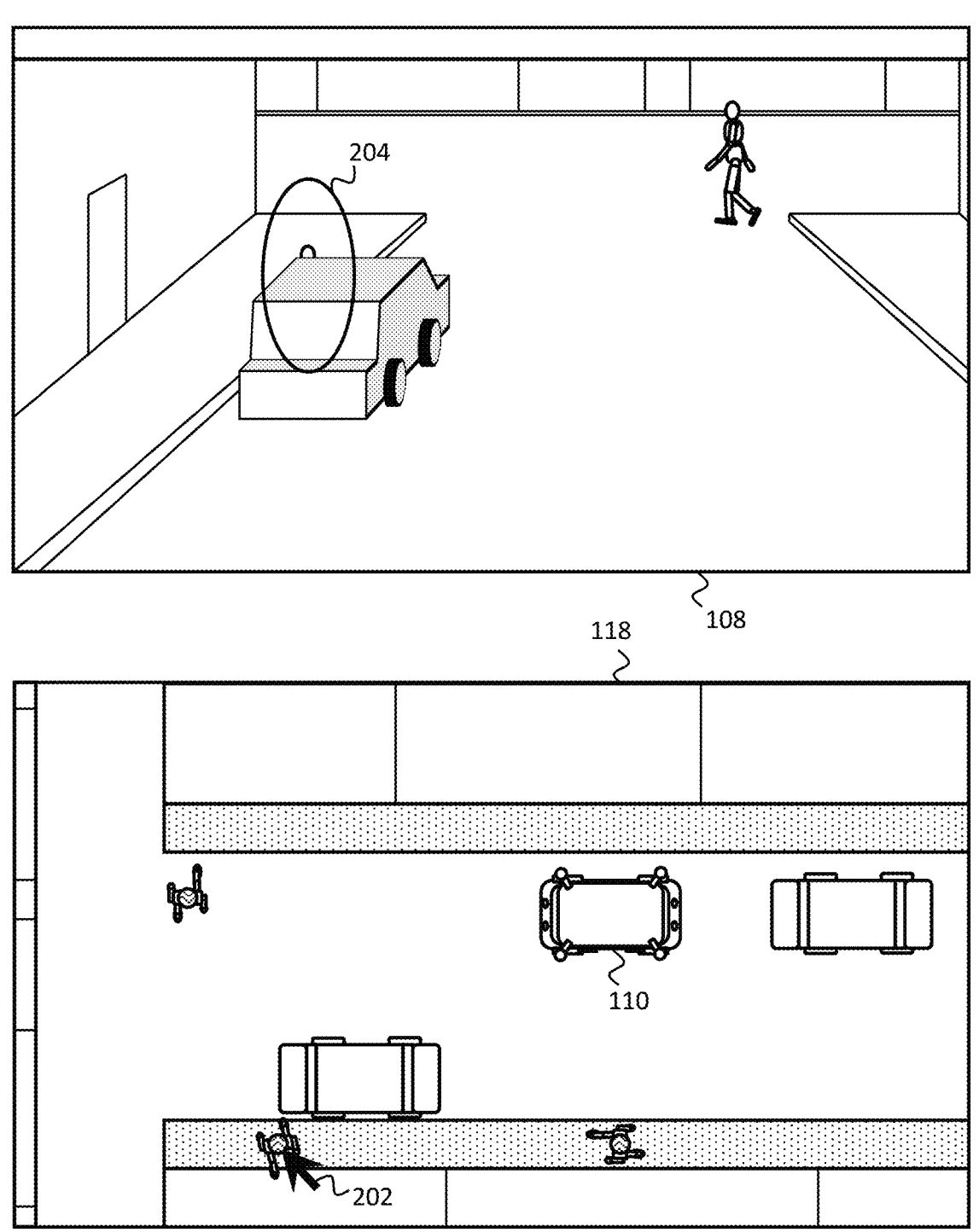

FIG. 11 depicts a close up of the output on the one or more displays 106 as viewed by the operator 122, according to another example. As shown, the output on the one or more displays 106 includes the representation 108 of the video frame data. As also shown in FIG. 11, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

In examples, a feature (i.e., a pedestrian in this example), may be partially or fully obscured/hidden in one of the areas/views 118, 108. For example, as shown in FIG. 11, the pedestrian may be obscured at least partially by another object in the environment, such as the vehicle. It may therefore be useful for an operator 122 to provide a user input to select the feature (i.e., the pedestrian) in the view where the feature is visible, or most clearly visible. Accordingly, as described in previous examples, the operator 122 may provide a user input (such as a first user input) which causes the one or more displays 106 may display in the other area (i.e., within the other of the representation 108 of the video frame data or the model 118) an indication 204 of the feature at a particular position that corresponds to the same physical location in the environment.

In other examples, however, rather than requiring a user to provide a user input in one area to cause an indication of the feature to be displayed in the other area, an indication of a feature associated with one area may be automatically displayed in the other area. As an example, this may occur if a feature is visible or partially visible in only one area 108, 118, such as the feature is missing from the model 118 or is hidden/obscured in the representation 108 of the video frame data. Determining whether a feature is "missing" or "hidden/obscured" can be achieved by accessing the video frame data and the model (i.e., the output data). Accordingly, in examples, if it is determined that at least a first feature of a plurality of features is not present in both the video frame data and the model, the one or more displays 106 can display an indication of the feature in the representation 108 of the video frame data or the model 118 where the feature is "missing" or "hidden/obscured".

In examples where user input is not received at a particular position in the first or second areas, the location of the feature within the actual video frame data or model can be determined instead (i.e., instead of converting/translating a first position on a display 106 to a second position on a display 106, as discussed in the previous examples). For example, for each feature in the model, a check may be made to determine whether the video frame data comprises data corresponding to the feature (or vice versa).

If the feature is present (i.e., is not missing or obscured) in the model 118, a location of that feature can be determined in the model (or vice versa). If the model and video frame data are associated with different coordinate systems, this location can be converted/translated into a location in the other of the model or video frame data. For example, a corresponding location of the feature can be determined in the video frame data, based on the location in the model. If the model and video frame data are associated with the same coordinate system (so a location of one feature in the model corresponds to the same location in the video frame data), no translation between coordinate systems is required. From here, a physical position on a display 106 can be determined. To determine where on the one or more displays 106 the indication of the feature should be displayed (i.e., where the position of the indication should be displayed), a process similar to that described in FIG. 2 can be followed.

In examples, the position of where to display the indication may be determined by: (i) determining a location of a feature within the video frame data or the model and (ii) determining the position (on the display) that corresponds to the location. For example, in the case of FIG. 11, where the feature is present in the model, but not in the video frame data, determining the position of where to display the indication may be achieved by: (i) determining a location of a feature within the model, and (ii) based on the location, determining a position (on the display) based on the location, where the position is a position within the representation of the video frame data (i.e., the first area). In other examples, where the feature is present in the video frame data, but not in the model, determining the position of where to display the indication may be achieved by: (i) determining a location of a feature within the video frame data, and (ii) based on the location, determining a position (on the display) based on the location, where the position is a position within the model (i.e., the second area).

In examples, locations in the video frame data and model correspond to the same physical location in the environment, and the locations within the environment may be associated with a coordinate system.

In other cases, the video frame data may be associated with a first coordinate system and the model (and therefore the output data) may be associated with a second coordinate system. Thus, in examples, step (ii) may initially comprise converting between the first and second coordinate systems. In some cases, each location in the video frame data (that is, each location within the first coordinate system) may be mapped to a corresponding location in the model (that is, each location within the second coordinate system), where the corresponding locations correspond to the same physical location in the environment.

In examples, each location in the video frame data and model may be mapped to positions in the first area (i.e., the representation 108 of the video frame data) and the second area (i.e., the model 118). Accordingly, once a location in the video frame data or model is known, a corresponding position in the first or second areas can be determined. A lookup table may be used to convert locations in the video frame data and model to the two areas.

After the position on the display has been determined, the one or more displays 106 can display an indication 204 of the feature at the position. In the example of FIG. 11, because the feature was not present in the video frame data, and therefore was not displayed in the first area (i.e., within the representation 108 of the video frame data), the position corresponds to a position in the first area (i.e., within the representation 108 of the video frame data). FIG. 11, therefore shows an indication 204 of the feature, in this case a marker in the form of circle surrounding the corresponding "missing", "hidden" or partially "hidden" feature displayed within the representation 108 of the video frame data. The indication 204 is therefore displayed at a location corresponding to the same feature in the environment. The operator 122 viewing the representation 108 of the video frame data can therefore see where in the representation 108 of the video frame data the same feature is located. In examples, a graphical model of the feature (i.e., the pedestrian) may be generated instead of a marker.

As discussed in other examples, data may be sent or otherwise transmitted from the system 100 to the vehicle 110 after, simultaneously with, or before the one or more displays 106 display an indication 204 of the feature at the position.

Figure 12:
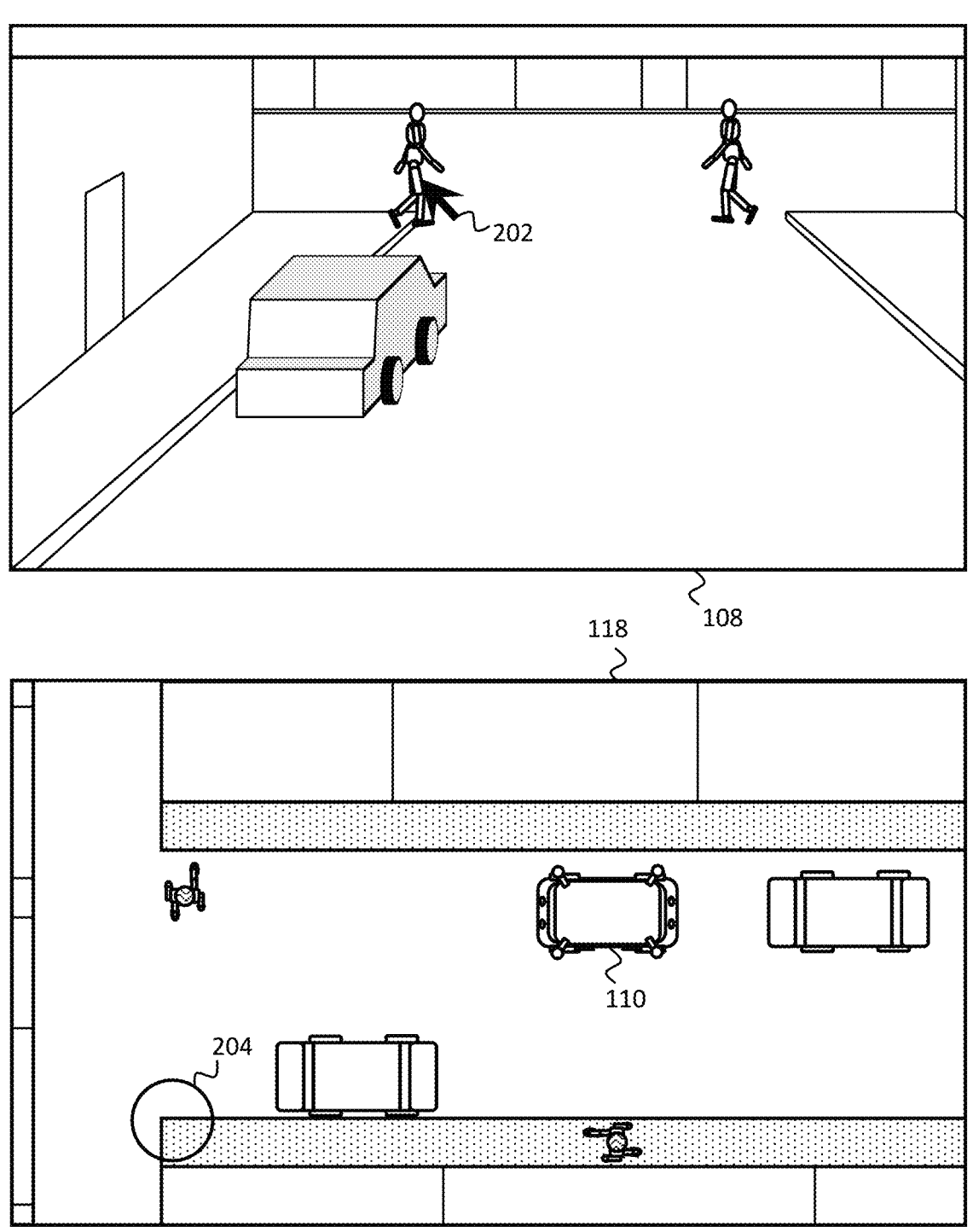

FIG. 12 depicts a close up of the output on the one or more displays 106 as viewed by the operator 122, according to another example. As shown, the output on the one or more displays 106 includes the representation 108 of the video frame data. As also shown in FIG. 12, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

In examples, a feature (i.e., a pedestrian in this example), may not be present in one of the areas/views 118, 108. For example, as shown in FIG. 12, the pedestrian may be visible in the representation 108 of the video frame data, but may be missing from the model 118. It may therefore be useful for an operator 122 to provide a user input to select the feature (i.e., the pedestrian) in the view where the feature is visible. Accordingly, as described in previous examples, the operator 122 may provide a user input (such as a first user input) which causes the one or more displays 106 may display in the other area (i.e., within the other of the representation 108 of the video frame data or the model 118) an indication 204 of the feature at a particular position that corresponds to the same physical location in the environment.

In other examples, however, rather than requiring a user to provide a user input in one area to cause an indication of the feature to be displayed in the other area, an indication of a feature associated with one area may be automatically displayed in the other area. As an example, this may occur if a feature is visible or partially visible in only one area 108, 118, such as the feature is missing from the model 118 or is hidden/obscured in the representation 108 of the video frame data. Determining whether a feature is "missing" or "hidden/obscured" can be achieved by accessing the video frame data and the model (i.e., the output data). Accordingly, in examples, if it is determined that at least a first feature of a plurality of features is not present in both the video frame data and the model, the one or more displays 106 can display an indication of the feature in the representation 108 of the video frame data or the model 118 where the feature is "missing" or "hidden/obscured".

As discussed in relation to FIG. 11, in examples where user input is not received at a particular position in the first or second areas, the position to display the indication 204 can be determined automatically. After the position has been determined, the one or more displays 106 can display an indication 204 of the feature at the position. In the example of FIG. 12, because the feature was not present in the model, and therefore was not displayed in the second area (i.e., within the model 118), the position corresponds to a position in the second area (i.e., within the model 118). FIG. 12, therefore shows an indication 204 of the feature, in this case a marker in the form of circle surrounding the corresponding "missing", "hidden" or partially "hidden" feature displayed within the model 118. The indication 204 is therefore displayed at a location corresponding to the same feature in the environment. The operator 122 viewing the model 118 can therefore see where in the model 118 the same feature is located. In examples, a graphical model of the feature (i.e., the pedestrian) may be generated instead of a marker.

As discussed in other examples, data may be sent or otherwise transmitted from the system 100 to the vehicle 110 after, simultaneously with, or before the one or more displays 106 display an indication 204 of the feature at the position.

Regardless of whether user input was received to select the feature, or whether the indication was displayed automatically, the data sent from the system 100 to the vehicle 110 may comprise additional output data (such as additional perception output data), where the additional output data is associated with the feature. This additional output data is particularly useful in cases where the model (and therefore the output data used by the planning component of the vehicle) is missing data associated with the feature/object. This may occur if a sensor 112 is faulty, or if the sensor 112 has a restricted view of the environment, perhaps due to another object blocking the sensor for example. Accordingly, in examples, additional output data may be generated by the system, where the additional output data is associated with the feature and the data sent by the system to the vehicle comprises the additional output data. In examples, the additional output data comprises data associated with the feature (such as a classification), and a location of the feature within the environment. In cases where user input was received to select the feature, the location of the feature within the environment may be based on the first position associated with the user input.

Figure 13:
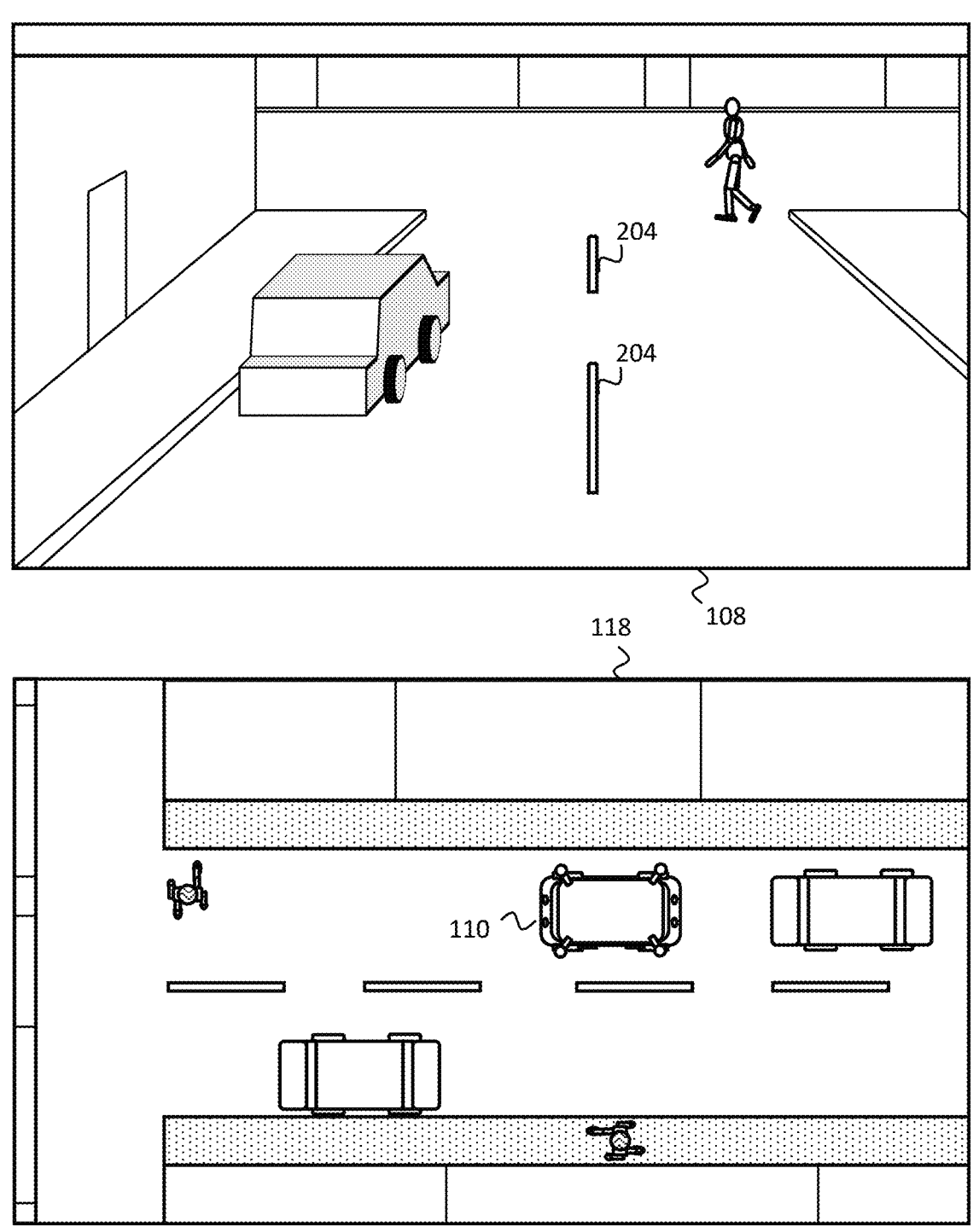

FIG. 13 depicts a close up of the output on the one or more displays 106 as viewed by the operator 122, according to another example. As shown, the output on the one or more displays 106 includes the representation 108 of the video frame data. As also shown in FIG. 13, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

In this example, the output data received from the vehicle 110 comprises map data, where the map data contains location information associated with one or more map features (such as roads, pavements, intersections, traffic signals, etc.). In other examples, the map data is accessible by the system 100, in addition to, or without being received from the vehicle. An indication of the map data (i.e., the map features) can be displayed in both the representation 108 of the video frame data and the model 118. In examples, indications of map data is always displayed in the model 118, so that the operator 122 is aware of where in the model 118 lane boundaries, intersections, etc. are located. In examples, it may be useful to incorporate the map data into the representation 108 of the video frame data. This may be done automatically (or upon user request). If physical map features are found in the representation 108 of the video frame data (such as lines being painted on the road), the indication of the corresponding map features should overlay the physical map features in the representation 108 of the video frame data. If the physical map features are offset from the indications of the map features that have been displayed in the representation 108 of the video frame data, this may be an indication of a problem, such as the vehicle 110 incorrectly determining its location or a poor calibration between the video camera and the other sensors 112.

Indications of the map features can be displayed in the representation 108 of the video frame data automatically. As discussed in relation to FIG. 11, the position to display the indication(s) 204 can be determined automatically. For example, each map feature in the map data, is associated with a location within the model (and therefore the environment). From here, a position (on the display) that corresponds to the location can be determined. After the position has been determined, the one or more displays 106 can display an indication 204 of the feature at the position in the representation 108 of the video frame data. It will be appreciated that certain map features, such as lane markers, may be associated with a plurality of locations, and the indication 204 of the map feature may correspond to each of those locations. In other words, an indication may be displayed at a plurality of positions on the one or more displays 106. In the same or similar way, route data (such as a navigation path or corridor) can be indicated in the representation 108 of the video frame data.

FIG. 13, therefore shows an indication 204 of a map feature, in this case a lane marker, displayed within the representation 108 of the video frame data. The indication 204 is therefore displayed at a location corresponding to the same physical map feature. The operator 122 viewing the representation 108 of the video frame data can therefore see where in the representation 108 of the video frame data the same feature is located.

As discussed in other examples, data may be sent or otherwise transmitted from the system 100 to the vehicle 110 after, simultaneously with, or before the one or more displays 106 display an indication 204 of the feature at the position.

As another example, colours within the representation 108 of the video frame data may be incorporated into the model 118. This may be done automatically (or upon user request). As such, displaying an indication of a feature may correspond to displaying, within the model 118, an indication of a colour of the feature, where the colour is determined from the representation 108 of the video frame data. Colours within the representation 108 of the video frame data may also be incorporated into the model 118 in any of the examples where user input selects a particular feature in the representation 108 of the video frame data or the model 118.

Figure 14:
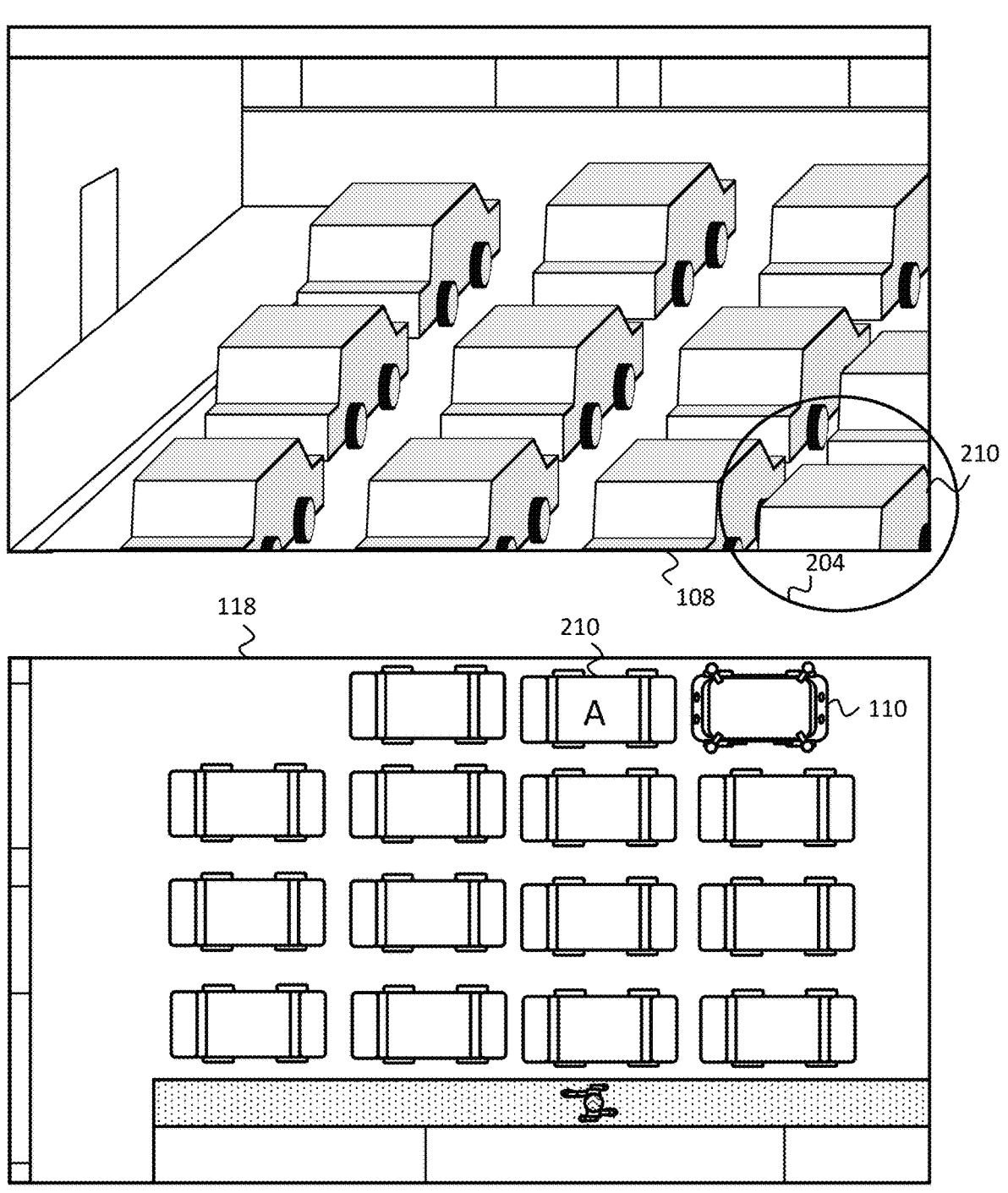

FIG. 14 depicts a close up of the output on the one or more displays 106 as viewed by the operator 122, according to another example. As shown, the output on the one or more displays 106 includes the representation 108 of the video frame data. As also shown in FIG. 14, the output on the one or more displays 106 may also include a 2D or 3D model 118 of the environment based on the environmental data. The model 118 may comprise models/renders of buildings, vehicles and pedestrians around the vehicles, as well as a model/render of the vehicle 110 itself.

As briefly mentioned above, in examples, if it is detected that the environment (such as the output data) contains a priority agent/object (such as an emergency vehicle), an indication of the priority agent may be displayed in the video view (or vice versa). This may be useful to accentuate the priority agent to the operator 122, in case the priority agent is not visible or is hard to see within one view. For example, as shown in FIG. 14, the vehicle 110 may be stuck in traffic, and several other vehicles may be in close proximity to the vehicle 110.

The vehicle 110 and or system 100 may determine, based on the output data that a priority agent 210, such an ambulance. For example, sensors 112 on the vehicle 112 may capture environmental data, where the environmental data is indicative of a siren, text, such "ambulance" and/or other data that is indicative of the vehicle being a priority agent 210. The model 118 may therefore render the feature as a priority agent 210. FIG. 14, for example, depicts an "A"

on the model of the priority agent 210 to inform the operator 122 that the vehicle is an ambulance. In some cases, such as due to one or more obstructions, a particular field of view, lighting conditions, etc., the priority agent 210 may be less noticeable in the representation 108 of the video frame data. In examples, it may therefore be useful to indicate priority agents 210 in the representation 108 of the video frame data. This may be done automatically, for example, without requiring a user input to select the feature in one of the views 108, 118.

As discussed in FIG. 11, in examples where user input is not received at a particular position in the first or second areas, the location of the feature within the model can be determined instead (i.e., instead of converting/translating a first position on a display 106 to a second position on a display 106, as discussed in the previous examples). For example, if a priority agent 210 is detected in the model 118, a location of that feature can be determined in the model. This location can be converted/translated into a location in the video frame data. For example, a corresponding location of the feature can be determined in the video frame data, based on the location in the model. From here, a physical position on a display 106 can be determined, as discussed in FIG. 11.

After the position on the display has been determined, the one or more displays 106 can display an indication 204 of the feature at the position. In the example of FIG. 14, because the feature was detected in the model, the position corresponds to a position in the first area (i.e., within the representation 108 of the video frame data). FIG. 14, therefore shows an indication 204 of the feature (priority agent 210) displayed within the representation 108 of the video frame data in this case a marker in the form of circle surrounding the corresponding "missing", "hidden" or partially "hidden" feature. The indication 204 is therefore displayed at a location corresponding to the same feature in the environment. The operator 122 viewing the representation 108 of the video frame data can therefore see where in the representation 108 of the video frame data the priority agent 210 is located. In examples where the field of view of the camera is such that the representation of the video frame data does not include the priority agent, an indication 204 may nevertheless be displayed informing the operator 122 that a priority agent is near, such as just out view. The indication may, for example, reference the location of the priority agent within the environment. For example, the indication may include an arrow, pointing in a particular direction of the priority agent.

As discussed in other examples, data may be sent or otherwise transmitted from the system 100 to the vehicle 110 after, simultaneously with, or before the one or more displays 106 display an indication 204 of the feature at the position. For example, the data may comprise data associated with the priority agent, such as a driving instruction, etc.

In some examples, when the one or more displays 106 display the model 118, the one or more displays 106 display or render the model 118 such that it has a perspective substantially corresponding a perspective of the representation 108 of the video frame data. The model 118 may therefore be rendered from the same position in the environment and having the same field of view as the representation 108 of the video frame data. This may allow features from one view, such as a pedestrian, to be rendered in the other view more easily. For example, if a pedestrian is obscured by a vehicle, a 3D rendering of the pedestrian may be displayed on the representation 108 of the video frame data, in a similar way as described above in relation to FIG. 11.

Figure 15:
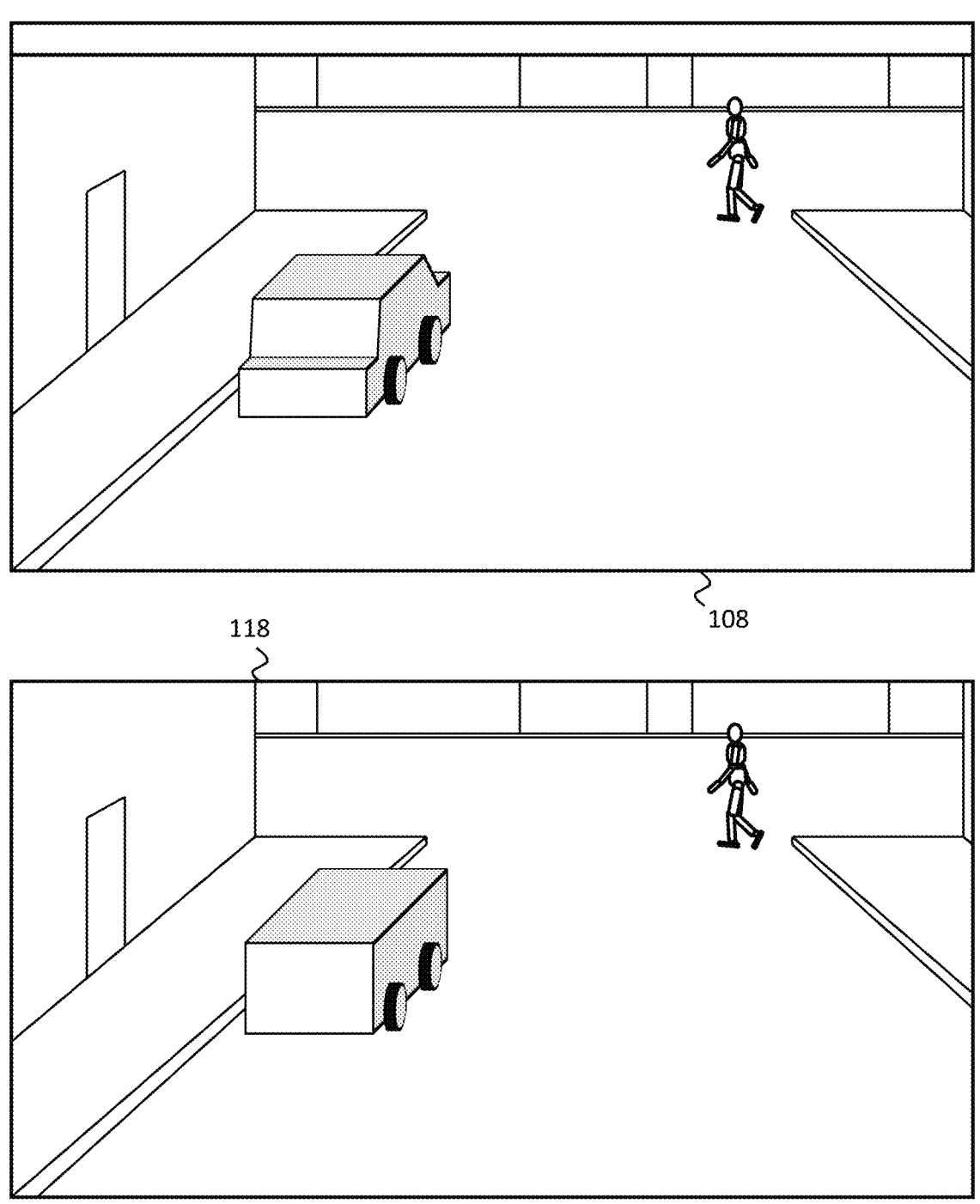

FIG. 15 therefore depicts a close up of the output on the one or more displays 106 as viewed by the operator 122, according to another example. As shown, the output on the one or more displays 106 includes the representation 108 of the video frame data. As also shown in FIG. 15, the output on the one or more displays 106 includes a model 118 of the environment based on the environmental data. The model 118 is rendered to have the same perspective as the representation 108 of the video frame data.

Figure 16:
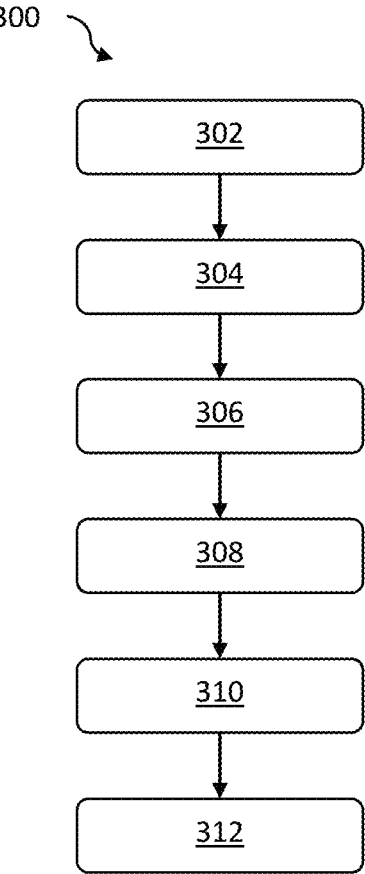
FIG. 16 depicts a flow chart of a method according to an example.

FIG. 16 illustrates a flow chart of an example method 300. The example method 300 may be implemented by one or more components of the system 100. In examples, the method 300 may be encoded and stored as instructions on one or more non-transitory computer-readable media that, when executed by the one or more processors 102 of the system 100, cause the system 100 to implement the method 300. In examples, the method is a computer implemented method.

As can be seen in FIG. 16, the method/process 300 may comprise, at step 302, receiving, at a system, from an autonomous vehicle: (i) sensor data captured by a sensor of the vehicle, and (ii) output data, wherein the output data is generated based at least in part on environmental data captured by one or more sensors of the vehicle and used by a planning component of the vehicle to navigate in an environment, where the sensor data and the output data are indicative of the environment. At step 304, the method comprises causing one or more displays to display at least one of: (i) a representation of the sensor data, or (ii) a model of the environment based on the output data. In some examples, step 304 comprises causing the one or more displays to display both: (i) a representation of the sensor data, or (ii) a model of the environment based on the output data. For example, the representation of the sensor data may be displayed in a first area, and the model may be displayed in a second area. At step 306, the method comprises determining a location of a feature within the sensor data or the model (which may correspond to determining a location within the environment, such as within a coordinate system). At step 308, the method comprises causing the one or more displays to display an indication of the feature at a position on the one or more displays corresponding to the location. For example, if the location of the feature is determined in the sensor data, the indication may be displayed in the model, and if location of the feature is determined in the model, the indication may be displayed in the representation of the sensor data. At step 310, the method comprises receiving, at the system, user input. At step 312, the method comprises sending, by the system to the vehicle, data based on the user input to cause the vehicle to take an action.

As mentioned, in some examples, the sensor data may correspond to video data comprising video frame data.

As mentioned, in some cases, step 306 is triggered based on receiving the user input (such as a first user input). Step 310 may therefore occur before step 306, although one or more further user inputs may be received after step 306. Accordingly, in examples, steps 306 to 308 instead comprise determining a first position within the first area or the second area associated with the feature (as discussed in earlier examples), determining, based at least in part on the first position, a second position of the feature within the other of the first area or the second area, and based at least in part on whether the first position is within the first area or the second area of the one or more displays, causing the one or more displays to display in the other of the first area or the second area an indication of the feature at the second position.

In other cases, step 306 is triggered based on an object/feature having a classification probability that is low, such as below a threshold probability. For example, if an object in the model data is determined to be a pedestrian, but the vehicle has a low confidence that this is correct (the object may in fact be a traffic cone), then the object may be indicated in the representation of the video frame data. Low classification probability features than therefore be indicated/highlighted to the operator.

In some examples, a user may indicate (via an input) that features having a certain classification should be indicated in the representation of the video frame data. For example, it may be useful for all pedestrians (as determined in the model) to be indicated in the video representation of the video frame data.

In examples, steps 310 and 312 are omitted.

FIG. 17 illustrates a block diagram of an example system 400 that implements the techniques discussed above and herein. FIG. 17 may represent vehicle 110 and system 100 of FIG. 1. In some instances, the example system 400 may include a vehicle 402, which may represent the vehicle 110 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include a vehicle computing device(s) 404, sensor(s) 406, emitter(s) 408, network interface(s) 410, and/or drive system(s) 412. Sensor(s) 406 may represent sensor(s) 112, discussed above.

In some instances, the sensor(s) 406 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 406 may include multiple instances of each of these or other types of sensors. For instance, the radar sensors may include individual radar sensors located at the corners, front, back, sides, and/or top of the vehicle 402. As another example, the cameras may include multiple cameras disposed at various locations about the exterior and/or interior of the vehicle 402. The sensor(s) 406 may provide input to the vehicle computing device(s) 404 and/or to computing device(s) 432.

Data captured by sensor(s) may be known as sensor data or environmental data. Sensor data captured by a camera may be known as sensor data or video frame data, in examples.

The vehicle 402 may also include emitter(s) 408 for emitting light and/or sound, as described above. The emitter(s) 408 may include interior audio and visual emitter(s) to communicate with passengers of the vehicle 402. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include network interface(s) 410 that enable communication between the vehicle 402 and one or more other local or remote computing device(s). The network interface(s) 410 may facilitate communication with other local computing device(s) on the vehicle 402 and/or the drive component(s) 412. The network interface(s) 410 may additionally or alternatively allow the vehicle to communicate with other nearby computing device(s) (e.g., other nearby vehicles, traffic signals, etc.). The network interface(s) 410 may additionally or alternatively enable the vehicle 402 to communicate with computing device(s) 432 over a network 438. In some examples, computing device(s) 432 may comprise one or more nodes of a distributed computing system (e.g., a cloud computing architecture). The computing device(s) 432 corresponds to system 100, discussed above.

The vehicle 402 may include one or more drive components 412. In some instances, the vehicle 402 may have a single drive component 412. In some instances, the drive component(s) 412 may include one or more sensors to detect conditions of the drive component(s) 412 and/or the surroundings of the vehicle 402. By way of example and not limitation, the sensor(s) of the drive component(s) 412 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 412. In some cases, the sensor(s) on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 412. Furthermore, the drive component(s) 412 may also include one or more communication connection(s) that enable communication by the respective drive component with one or more other local or remote computing device(s).

The vehicle computing device(s) 404 may include processor(s) 414 and memory 416 communicatively coupled with the one or more processors 414. Computing device(s) 432 may also include processor(s) 434, and/or memory 436. The processor(s) 414 and/or 434 may be any suitable processor capable of executing instructions to process data and perform operations as described herein. By way of example and not limitation, the processor(s) 414 and/or 434 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 416 and/or 436 may be examples of non-transitory computer-readable media. The memory 416 and/or 436 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 416 and/or memory 436 may store a perception component 418, localization component 420, planning component 422, map(s) 424, driving log data 426, prediction component 428, and/or system controller(s) 430—zero or more portions of any of which may be hardware, such as GPU(s), CPU(s), and/or other processing units.

The perception component 418 may detect object(s) in in an environment surrounding the vehicle 402 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 418 is referred to as perception output data. The perception component 418 may be configured to associate a bounding region (or other indication) with an identified object. The perception component 418 may be configured to associate a confidence score associated with a classification of the identified object with an identified object. In some examples, objects, when rendered via a display, can be colored based on their perceived class. The object classifications determined by the perception component 418 may distinguish between different object types such as, for example, a passenger vehicle, a pedestrian, a bicyclist, motorist, a delivery truck, a semi-truck, traffic signage, and/or the like.

In at least one example, the localization component 420 may include hardware and/or software to receive data from the sensor(s) 406 to determine a position, velocity, and/or orientation of the vehicle 402 (e.g., one or more of an x-, y-, z-position, roll, pitch, or yaw). For example, the localization component 420 may include and/or request/receive map(s) 424 of an environment and can continuously determine a location, velocity, and/or orientation of the autonomous vehicle 402 within the map(s) 424. In some instances, the localization component 420 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 420 may provide data to various components of the vehicle 402 to determine an initial position of an autonomous vehicle for generating a trajectory and/or for generating map data, as discussed herein. In some examples, localization component 420 may provide, to the perception component 418, a location and/or orientation of the vehicle 402 relative to the environment and/or sensor data associated therewith.

The planning component 422 may receive a location and/or orientation of the vehicle 402 from the localization component 420 and/or perception data from the perception component 418 and may determine instructions for controlling operation of the vehicle 402 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 430 and/or drive component(s) 412 may parse/cause to be carried out, second instructions for the emitter(s) 408 may be formatted according to a second format associated therewith).

The driving log data 426 may comprise sensor data, perception data, and/or scenario labels collected/determined by the vehicle 402 (e.g., by the perception component 418), as well as any other message generated and or sent by the vehicle 402 during operation including, but not limited to, control messages, error messages, etc. In some examples, the vehicle 402 may transmit the driving log data 426 to the computing device(s) 432.

The prediction component 428 may generate one or more probability maps representing prediction probabilities of possible locations of one or more objects in an environment. For example, the prediction component 428 may generate one or more probability maps for vehicles, pedestrians, animals, and the like within a threshold distance from the vehicle 402. In some examples, the prediction component 428 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planning component 422 may be communicatively coupled to the prediction component 428 to generate predicted trajectories of objects in an environment. For example, the prediction component 428 may generate one or more predicted trajectories for objects within a threshold distance from the vehicle 402. In some examples, the prediction component 428 may measure a trace of an object and generate a trajectory for the object based on observed and predicted behavior. Although prediction component 428 is shown on a vehicle 402 in this example, the prediction component 428 may also be provided elsewhere, such as in a remote computing device. In some examples, a prediction component may be provided at both a vehicle and a remote computing device. These components may be configured to operate according to the same or a similar algorithm. Data generated by the prediction component 428 may be provided to the computing device(s) 432 as prediction output data. More generally, output data may be provided to the computing device(s) 432 and the output data may comprise perception output data and prediction output data. The output data may be used by the planning component 422 to navigate in the environment.

The memory 416 and/or 436 may additionally or alternatively store a mapping system, a planning system, a ride management system, etc. Although perception component 418 and/or planning component 422 are illustrated as being stored in memory 416, perception component 418 and/or planning component 422 may include processor-executable instructions, machine-learned model(s) (e.g., a neural network), and/or hardware.

As described herein, the localization component 420, the perception component 418, the planning component 422, and/or other components of the system 400 may comprise one or more ML models. For example, the localization component 420, the perception component 418, and/or the planning component 422 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 420 may additionally or alternatively store one or more system controller(s) 430, which may be configured to control steering, propulsion, braking, safety, emitters, communication, and other systems of the vehicle 402. These system controller(s) 430 may communicate with and/or control corresponding systems of the drive component(s) 412 and/or other components of the vehicle 402.

It should be noted that while FIG. 17 is illustrated as a distributed system, in alternative examples, components of the vehicle 402 may be associated with the computing device(s) 432 and/or components of the computing device(s) 432 may be associated with the vehicle 402. That is, the vehicle 402 may perform one or more of the functions associated with the computing device(s) 432, and vice versa.

EXAMPLE CLAUSES

A system comprising:
one or more processors; and
one or more non-transitory computer readable media having instructions stored thereon which, when executed by the one or more processors, cause the one or more processors (or system) to perform operations comprising:
receiving, at the system, from an autonomous vehicle:
video frame data captured by a video camera of the vehicle; and
perception output data generated by the vehicle, wherein the perception output data is generated based at least in part on environmental data captured by one or more sensors of the vehicle and is used by a planning component of the vehicle to navigate in an environment, wherein the video frame data and perception output data are indicative of the environment;
causing a first area of one or more displays to display a representation of the video frame data;
causing a second area of the one or more displays to display a model of the environment based on the perception output data;
receiving, at the system, user input, the user input being associated with a feature within one of the first area or the second area;
determining a first position within the first area or the second area associated with the feature;

determining, based at least in part on the first position, a second position of the feature within the other of the first area or the second area;

based at least in part on whether the first position is within the first area or the second area of the one or more displays, causing the one or more displays to display in the other of the first area or the second area an indication of the feature at the second position; and sending, by the system to the vehicle, data based at least in part on the user input to cause the vehicle to take an action.

The system of clause 1, wherein:

the feature corresponds to a navigation path for the vehicle;

the user input comprises user input corresponding to modifying or generating the navigation path for the vehicle; and the data sent by the system to the vehicle comprises data associated with the navigation path for the vehicle to follow the navigation path.

The system of clause 1, wherein:

the feature is visible within the displayed representation of the video frame data;

causing the one or more displays to display in the other of the first area or the second area an indication of the feature at the second position comprises causing the one or more displays to display in the second area an indication of the feature at the second position;

the operations further comprise generating additional perception output data for use by the planning component of the vehicle to navigate in the environment, wherein the additional perception output data is associated with the feature; and the data sent by the system to the vehicle comprises the additional perception output data, and the additional perception output data comprises:

data associated with the feature; and a location of the feature within the environment based on the first position.

The system of clause 1, wherein:

the feature corresponds to an object within the environment;

receiving, at the system, the user input, comprises receiving at least a first user input and a second user input, the first user input being associated with the first position within one of the first area or the second area of the one or more displays, and the second user input corresponding to a classification of the feature; and the data sent by the system to the vehicle comprises the classification.

The system of clause 1, wherein:

receiving, at the system, the user input, comprises receiving at least a first user input and a second user input, the first user input being associated with the first position within one of the first area or the second area of the one or more displays, and the second user input corresponding to a driving instruction for the vehicle; and the data sent by the system to the vehicle comprises the driving instruction that the vehicle uses to navigate in the environment.

The system of any preceding clause, wherein:

the video frame data and the model are associated with a coordinate system;

determining, based at least in part on the first position, the second position of the feature within the other of the first area or the second area, comprises:

determining a location of the feature within the coordinate system, based on the first position; and determining the second position based on the location.

The system of clause 1, wherein: the feature corresponds to a predicted path associated with an object in the environment; and the user input corresponds to a selection of the object visible in one of the displayed representation of the video frame data or the displayed model.

A method, comprising:

receiving, at a system, from an autonomous vehicle:

sensor data captured by a sensor of the vehicle; and output data, wherein the output data is generated based at least in part on environmental data captured by one or more sensors of the vehicle and used by a planning component of the vehicle to navigate in an environment, wherein the sensor data and the output data are indicative of the environment;

causing one or more displays to display at least one of: (i) a representation of the sensor data, or (ii) a model of the environment based on the output data;

determining a location of a feature within the sensor data or the model;

causing the one or more displays to display an indication of the feature at a position on the one or more displays corresponding to the location;

receiving, at the system, user input; and sending, by the system to the vehicle, data based on the user input to cause the vehicle to take an action.

The method of clause 8, wherein determining the location of the feature within the sensor data or the model comprises automatically determining the location of the feature within the sensor data or the model.

The method of clause 9, wherein the feature is a first feature of a plurality of features in the environment, and wherein the method comprises:

determining that at least the first feature of the plurality of features is not present in both the sensor data and the model; and based on determining that at least the first feature of the plurality of features is not present in both the sensor data and the model:

causing the one or more displays to display the indication of the feature.

The method of clause 9, wherein:

the feature corresponds to a priority agent;

causing the one or more displays to display at least one of: (i) a representation of the sensor data, or (ii) the model and causing the one or more displays to display an indication of the feature comprises:

causing the one or more displays to display at least the representation of the sensor data; and causing the one or more displays to display an indication of the priority agent within the representation of the sensor data; and the data sent by the system to the vehicle comprises data associated with the priority agent.

The method of any of clauses 8 to 11, wherein:

causing the one or more displays to display at least one of: (i) the representation of the sensor data, or (ii) the model, comprises:

causing the one or more displays to display both: (i) the representation of the sensor data, and (ii) the model; and causing the one or more displays to display both: (i) the representation of the sensor data, and (ii) the model, comprises:

causing the one or more displays to display the model such that it has a perspective substantially corresponding a perspective of the representation of the sensor data.

The method of clause 8, wherein:

causing the one or more displays to display at least one of: (i) the representation of the sensor data, or (ii) the model, comprises:

causing the one or more displays to display both: (i) the representation of the sensor data, and (ii) the model;

receiving, at the system, the user input, comprises receiving at least a first user input, the first user input being associated with the feature and a first position on the one or more displays within the displayed representation of the sensor data or the displayed model;

receiving the first user input causes the location of the feature within the sensor data or the model to be determined based on the first position; and causing the one or more displays to display an indication of the feature at a position on the one or more displays corresponding to the location, comprises:

based at least in part on whether the first position is within the displayed representation of the sensor data or the displayed model, causing the one or more displays to display the indication of the feature at the position in the other of the displayed representation of the sensor data or the displayed model based on the first position.

The method of clause 13, wherein:

the feature corresponds to a navigation path for the vehicle;

the first user input corresponds to modifying or generating the navigation path for the vehicle; and the data sent by the system to the vehicle comprises data associated with the navigation path for the vehicle to follow the navigation path.

The method of clause 13, wherein:

the feature corresponds to a predicted path associated with an object in the environment; and the first user input corresponds to a selection of the object visible in one of the displayed representation of the sensor data or the displayed model.

The method of clause 13, wherein:

receiving, at the system, the user input, comprises receiving at least the first user input and a second user input, the second user input corresponding to one of:

a driving instruction for the vehicle; or a classification of the feature; and wherein the data sent by the system to the vehicle comprises one of:

the driving instruction; or the classification.

The method of any of clauses 8 to 16, wherein causing the one or more displays to display at least one of: (i) the representation of the sensor data, or (ii) the model, comprises:

causing the one or more displays to display at least the representation of the sensor data;

wherein determining the location of the feature within the sensor data or the model comprises:

determining the location of the feature within the model; and wherein causing the one or more displays to display the indication of the feature at a position on the one or more displays corresponding to the location comprises:

causing the one or more displays to display the indication of the feature at the position within the representation of the sensor data.

The method of any of clauses 8 to 16, wherein causing the one or more displays to display at least one of: (i) the representation of the sensor data, or (ii) the model, comprises:

causing the one or more displays to display at least the model;

wherein determining the location of the feature within the sensor data or the model comprises:

determining the location of the feature within the sensor data; and wherein causing the one or more displays to display the indication of the feature at a position on the one or more displays corresponding to the location comprises:

causing the one or more displays to display the indication of the feature at the position within the model.

The method of any of clauses 8 to 18, wherein the sensor data is video frame data.

The method of clause 8, wherein:

the feature is visible within the displayed representation of the sensor data;

causing the one or more displays to display an indication of the feature at a position on the one or more displays corresponding to the location, comprises causing the one or more displays to display in the model, an indication of the feature at the position;

the method further comprises generating additional output data for use by the planning component of the vehicle to navigate in the environment, wherein the additional output data is associated with the feature; and the data sent by the system to the vehicle comprises the additional output data, and the additional output data comprises:

data associated with the feature; and the location of the feature within the environment.

The method of clause 8, wherein:

the sensor data and the model are associated with a coordinate system;

determining a location of a feature within the sensor data or the model, comprises determining a location of the feature within the coordinate system.

One or more non-transitory computer-readable media storing instructions that, when executed by one or more processors of a system, cause the system to perform operations comprising:

receiving, at the system, from an autonomous vehicle:

sensor data captured by a sensor of the vehicle; and output data, wherein the output data is generated based at least in part on environmental data captured by one or more sensors of the vehicle and used by a planning component of the vehicle to navigate in an environment, wherein the sensor data and the output data are indicative of the environment;

causing one or more displays to display at least one of: (i) a representation of the sensor data, or (ii) a model of the environment based on the output data;

determining a location of a feature within the sensor data or the model;

causing the one or more displays to display an indication of the feature at a position on the one or more displays corresponding to the location;

receiving, at the system, user input; and sending, by the system to the vehicle, data based on the user input to cause the vehicle to take an action.

The one or more non-transitory computer-readable media of clause 18, wherein at least one of:

wherein determining the location of the feature within the sensor data or the model comprises automatically determining the location of the feature within the sensor data or the model; and receiving, at the system, the user input, comprises receiving at least a first user input, the first user input being associated with the feature and a first position on the one or more displays within the displayed representation of the sensor data or the displayed model, wherein receiving the first user input causes the location of the feature within the sensor data or the model to be determined based on the first position.

One or more non-transitory computer-readable media storing instructions that, when executed by one or more processors of a system, cause the system to perform the method of any of clauses 8 to 21.

A system comprising:

one or more processors; and one or more non-transitory computer readable media having instructions stored thereon which, when executed by the one or more processors, cause the one or more processors to perform the method of any of clauses 8 to 21.

A method, comprising:

receiving, at a system, from an autonomous vehicle:

video frame data captured by a video camera of the vehicle; and perception output data generated by the vehicle, wherein the perception output data is generated based at least in part on environmental data captured by one or more sensors of the vehicle and is used by a planning component of the vehicle to navigate in an environment, wherein the video frame data and perception output data are indicative of the environment;

causing a first area of one or more displays to display a representation of the video frame data;

causing a second area of the one or more displays to display a model of the environment based on the perception output data;

receiving, at the system, user input, the user input being associated with a feature within one of the first area or the second area;

determining a first position within the first area or the second area associated with the feature;

determining, based at least in part on the first position, a second position of the feature within the other of the first area or the second area;

based at least in part on whether the first position is within the first area or the second area of the one or more displays, causing the one or more displays to display in the other of the first area or the second area an indication of the feature at the second position; and sending, by the system to the vehicle, data based at least in part on the user input to cause the vehicle to take an action.

The method of clause 26, wherein:

the feature corresponds to a navigation path for the vehicle;

the user input comprises user input corresponding to modifying or generating the navigation path for the vehicle; and the data sent by the system to the vehicle comprises data associated with the navigation path for the vehicle to follow the navigation path.

The method of clause 26, wherein:

the feature is visible within the displayed representation of the video frame data;

causing the one or more displays to display in the other of the first area or the second area an indication of the feature at the second position comprises causing the one or more displays to display in the second area an indication of the feature at the second position;

the method further comprises generating additional perception output data for use by the planning component of the vehicle to navigate in the environment, wherein the additional perception output data is associated with the feature; and the data sent by the system to the vehicle comprises the additional perception output data, and the additional perception output data comprises:

data associated with the feature; and a location of the feature within the environment based on the first position.

The method of clause 26, wherein:

the feature corresponds to an object within the environment;

receiving, at the system, the user input, comprises receiving at least a first user input and a second user input, the first user input being associated with the first position within one of the first area or the second area of the one or more displays, and the second user input corresponding to a classification of the feature; and the data sent by the system to the vehicle comprises the classification.

The method of clause 26, wherein:

receiving, at the system, the user input, comprises receiving at least a first user input and a second user input, the first user input being associated with the first position within one of the first area or the second area of the one or more displays, and the second user input corresponding to a driving instruction for the vehicle; and the data sent by the system to the vehicle comprises the driving instruction that the vehicle uses to navigate in the environment.

The method of any of clauses 26 to 30, wherein:

the video frame data and the model are associated with a coordinate system;

determining, based at least in part on the first position, the second position of the feature within the other of the first area or the second area, comprises:

determining a location of the feature within the coordinate system, based on the first position; and determining the second position based on the location.

The method of clause 26, wherein: the feature corresponds to a predicted path associated with an object in the environment; and the user input corresponds to a selection of the object visible in one of the displayed representation of the video frame data or the displayed model.

A system, comprising one or more processors and one or more non-transitory computer readable media having instructions stored thereon which, when executed by the one or more processors, cause the one or more processors (or the system) to perform operations comprising:

receiving, at a system, from an autonomous vehicle:

sensor data captured by a sensor of the vehicle; and output data, wherein the output data is generated based at least in part on environmental data captured by one or more sensors of the vehicle and used by a planning component of the vehicle to navigate in an environment, wherein the sensor data and the output data are indicative of the environment;

causing one or more displays to display at least one of: (i) a representation of the sensor data, or (ii) a model of the environment based on the output data;

determining a location of a feature within the sensor data or the model;

causing the one or more displays to display an indication of the feature at a position on the one or more displays corresponding to the location;

receiving, at the system, user input; and sending, by the system to the vehicle, data based on the user input to cause the vehicle to take an action.

The system of clause 33, wherein determining the location of the feature within the sensor data or the model comprises automatically determining the location of the feature within the sensor data or the model.

The system of clause 34, wherein the feature is a first feature of a plurality of features in the environment, and wherein the operations further comprise:

determining that at least the first feature of the plurality of features is not present in both the sensor data and the model; and based on determining that at least the first feature of the plurality of features is not present in both the sensor data and the model:

causing the one or more displays to display the indication of the feature.

The system of clause 34, wherein:

the feature corresponds to a priority agent;

causing the one or more displays to display at least one of:

(i) a representation of the sensor data, or (ii) the model and causing the one or more displays to display an indication of the feature comprises:

causing the one or more displays to display at least the representation of the sensor data; and causing the one or more displays to display an indication of the priority agent within the representation of the sensor data; and the data sent by the system to the vehicle comprises data associated with the priority agent.

The system of any of clauses 33 to 36, wherein:

causing the one or more displays to display at least one of:

(i) the representation of the sensor data, or (ii) the model, comprises:

causing the one or more displays to display both: (i) the representation of the sensor data, and (ii) the model; and causing the one or more displays to display both: (i) the representation of the sensor data, and (ii) the model, comprises:

causing the one or more displays to display the model such that it has a perspective substantially corresponding a perspective of the representation of the sensor data.

The system of clause 33, wherein:

causing the one or more displays to display at least one of:

(i) the representation of the sensor data, or (ii) the model, comprises:

causing the one or more displays to display both: (i) the representation of the sensor data, and (ii) the model;

receiving, at the system, the user input, comprises receiving at least a first user input, the first user input being associated with the feature and a first position on the one or more displays within the displayed representation of the sensor data or the displayed model;

receiving the first user input causes the location of the feature within the sensor data or the model to be determined based on the first position; and causing the one or more displays to display an indication of the feature at a position on the one or more displays corresponding to the location, comprises:

based at least in part on whether the first position is within the displayed representation of the sensor data or the displayed model, causing the one or more displays to display the indication of the feature at the position in the other of the displayed representation of the sensor data or the displayed model based on the first position.

The system of clause 38, wherein:

the feature corresponds to a navigation path for the vehicle;

the first user input corresponds to modifying or generating the navigation path for the vehicle; and the data sent by the system to the vehicle comprises data associated with the navigation path for the vehicle to follow the navigation path.

The system of clause 38, wherein:

the feature corresponds to a predicted path associated with an object in the environment; and the first user input corresponds to a selection of the object visible in one of the displayed representation of the sensor data or the displayed model.

The system of clause 38, wherein:

receiving, at the system, the user input, comprises receiving at least the first user input and a second user input, the second user input corresponding to one of:

a driving instruction for the vehicle; or a classification of the feature; and wherein the data sent by the system to the vehicle comprises one of:

the driving instruction; or the classification.

The system of any of clauses 33 to 41, wherein causing the one or more displays to display at least one of: (i) the representation of the sensor data, or (ii) the model, comprises:

causing the one or more displays to display at least the representation of the sensor data;

wherein determining the location of the feature within the sensor data or the model comprises:

determining the location of the feature within the model; and wherein causing the one or more displays to display the indication of the feature at a position on the one or more displays corresponding to the location comprises:

causing the one or more displays to display the indication of the feature at the position within the representation of the sensor data.

The system of any of clauses 33 to 41, wherein causing the one or more displays to display at least one of: (i) the representation of the sensor data, or (ii) the model, comprises:

causing the one or more displays to display at least the model;

wherein determining the location of the feature within the sensor data or the model comprises:

determining the location of the feature within the sensor data; and wherein causing the one or more displays to display the indication of the feature at a position on the one or more displays corresponding to the location comprises:

causing the one or more displays to display the indication of the feature at the position within the model.

The system of any of clauses 33 to 43, wherein the sensor data is video frame data.

The system of clause 33, wherein:

the feature is visible within the displayed representation of the sensor data;

causing the one or more displays to display an indication of the feature at a position on the one or more displays corresponding to the location, comprises causing the one or more displays to display in the model, an indication of the feature at the position;

the operations further comprise generating additional output data for use by the planning component of the vehicle to navigate in the environment, wherein the additional output data is associated with the feature; and the data sent by the system to the vehicle comprises the additional output data, and the additional output data comprises:

data associated with the feature; and the location of the feature within the environment.

The system of clause 33, wherein:

the sensor data and the model are associated with a coordinate system;

determining a location of a feature within the sensor data or the model, comprises determining a location of the feature within the coordinate system.

One or more non-transitory computer-readable media storing instructions that, when executed by one or more processors of a system, cause the system to perform the method of any of clauses 26 to 32.

A system comprising:

one or more processors; and one or more non-transitory computer readable media having instructions stored thereon which, when executed by the one or more processors, cause the one or more processors to perform the method of any of clauses 26 to 32.

The method of clause 8, wherein:

the output data comprises map data corresponding to a map feature;

the feature corresponds to a map feature;

determining a location of the feature within the sensor data or the model comprises determining a location of the feature within the model; and causing the one or more displays to display an indication of the feature at the position on the one or more displays corresponding to the location comprises causing the one or more displays to display an indication of the feature at the position in at least the representation of the sensor data.

The method of clause 8, wherein:

the output data comprises route data corresponding to a navigation path or a corridor for the vehicle;

the feature corresponds to the navigation path or the corridor;

determining a location of the feature within the sensor data or the model comprises determining a location of the feature within the model; and causing the one or more displays to display an indication of the feature at the position on the one or more displays corresponding to the location comprises causing the one or more displays to display an indication of the feature at the position in at least the representation of the sensor data.

While the example clauses described above are described with respect to one particular implementation, it should be understood that, in the context of this document, the content of the example clauses can also be implemented via a method, device, system, computer-readable medium, and/or another implementation. Additionally, any of example clauses 1-50 may be implemented alone or in combination with any other one or more of the example clauses.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer readable media having instructions stored thereon which, when executed by the one or more processors, cause the one or more processors to perform operations comprising:
receiving, at the system, from a vehicle, the vehicle an autonomous vehicle:
video frame data captured by a video camera of the vehicle; and
perception output data generated by the vehicle, wherein the perception output data is generated based at least in part on environmental data captured by one or more sensors of the vehicle and is used by a planning component of the vehicle to navigate in an environment, wherein the video frame data and perception output data are indicative of the environment;
causing a first area of one or more displays to display a representation of the video frame data;
causing a second area of the one or more displays to display a model of the environment based on the perception output data;
receiving, at the system, user input, the user input being associated with a feature within one of the first area or the second area;

determining a first position within the first area or the second area associated with the feature;
determining that the feature is not present within the other of the first area or the second area;
based at least in part on determining that the feature is not present within the other of the first area or the second area, causing the one or more displays to display in the other of the first area or the second area an indication of the feature at a second position; and
sending, by the system to the vehicle, data based at least in part on the user input to cause the vehicle to take an action.

2. The system of claim 1, wherein:
the feature corresponds to a navigation path for the vehicle;
the user input comprises user input corresponding to modifying or generating the navigation path for the vehicle; and
the data sent by the system to the vehicle comprises data associated with the navigation path for the vehicle to follow the navigation path.

3. The system of claim 1, wherein:
the feature is visible within the displayed representation of the video frame data;
causing the one or more displays to display in the other of the first area or the second area an indication of the feature at the second position comprises causing the one or more displays to display in the second area an indication of the feature at the second position;
the operations further comprise generating additional perception output data for use by the planning component of the vehicle to navigate in the environment, wherein the additional perception output data is associated with the feature; and
the data sent by the system to the vehicle comprises the additional perception output data, and the additional perception output data comprises:
data associated with the feature; and
a location of the feature within the environment based on the first position.

4. The system of claim 1, wherein:
the feature corresponds to an object within the environment;
receiving, at the system, the user input, comprises receiving at least a first user input and a second user input, the first user input being associated with the first position within one of the first area or the second area of the one or more displays, and the second user input corresponding to a classification of the feature; and
the data sent by the system to the vehicle comprises the classification.

5. The system of claim 1, wherein:
receiving, at the system, the user input, comprises receiving at least a first user input and a second user input, the first user input being associated with the first position within one of the first area or the second area of the one or more displays, and the second user input corresponding to a driving instruction for the vehicle; and
the data sent by the system to the vehicle comprises the driving instruction that the vehicle uses to navigate in the environment.

6. The system of claim 1, wherein:
the video frame data and the model are associated with a coordinate system;
determining, based at least in part on the first position, the second position of the feature within the other of the first area or the second area, comprises:

determining a location of the feature within the coordinate system, based on the first position; and determining the second position based on the location.

7. A method, comprising:

receiving, at a system, from a vehicle, the vehicle an autonomous vehicle:

sensor data captured by a sensor of the vehicle; and output data, wherein the output data is generated based at least in part on environmental data captured by one or more sensors of the vehicle and used by a planning component of the vehicle to navigate in an environment, wherein the sensor data and the output data are indicative of the environment;

causing one or more displays to display at least one of: (i) a representation of the sensor data, or (ii) a model of the environment based on the output data;

automatically determining a location of a feature within the sensor data or the model, the feature a first feature of a plurality of features in the environment;

determining that at least the first feature of the plurality of features is not present in both the sensor data and the model;

causing the one or more displays to display an indication of the feature at a position on the one or more displays corresponding to the location based at least in part on determining that at least the first feature of the plurality of features is not present in both the sensor data and the model;

receiving, at the system, user input; and sending, by the system to the vehicle, data based on the user input to cause the vehicle to take an action.

8. The method of claim 7, wherein:

the feature corresponds to a priority agent;

causing the one or more displays to display at least one of: (i) a representation of the sensor data, or (ii) the model and causing the one or more displays to display an indication of the feature comprises:

causing the one or more displays to display at least the representation of the sensor data; and causing the one or more displays to display an indication of the priority agent within the representation of the sensor data; and the data sent by the system to the vehicle comprises data associated with the priority agent.

9. The method of claim 7, wherein:

causing the one or more displays to display at least one of:

(i) the representation of the sensor data, or (ii) the model, comprises:

causing the one or more displays to display both: (i) the representation of the sensor data, and (ii) the model; and causing the one or more displays to display both: (i) the representation of the sensor data, and (ii) the model, comprises:

causing the one or more displays to display the model such that it has a perspective corresponding a perspective of the representation of the sensor data.

10. The method of claim 7, wherein:

causing the one or more displays to display at least one of:

(i) the representation of the sensor data, or (ii) the model, comprises:

causing the one or more displays to display both: (i) the representation of the sensor data, and (ii) the model;

receiving, at the system, the user input, comprises receiving at least a first user input, the first user input being associated with the feature and a first position on the one or more displays within the displayed representation of the sensor data or the displayed model;

receiving the first user input causes the location of the feature within the sensor data or the model to be determined based on the first position; and causing the one or more displays to display an indication of the feature at a position on the one or more displays corresponding to the location, comprises:

based at least in part on whether the first position is within the displayed representation of the sensor data or the displayed model, causing the one or more displays to display the indication of the feature at the position in the other of the displayed representation of the sensor data or the displayed model based on the first position.

11. The method of claim 10, wherein:

the feature corresponds to a navigation path for the vehicle;

the first user input corresponds to modifying or generating the navigation path for the vehicle; and the data sent by the system to the vehicle comprises data associated with the navigation path for the vehicle to follow the navigation path.

12. The method of claim 10, wherein:

the feature corresponds to a predicted path associated with an object in the environment; and the first user input corresponds to a selection of the object visible in one of the displayed representation of the sensor data or the displayed model.

13. The method of claim 10, wherein:

receiving, at the system, the user input, comprises receiving at least the first user input and a second user input, the second user input corresponding to one of:

a driving instruction for the vehicle; or a classification of the feature; and wherein the data sent by the system to the vehicle comprises one of:

the driving instruction; or the classification.

14. The method of claim 7, wherein causing the one or more displays to display at least one of: (i) the representation of the sensor data, or (ii) the model, comprises:

causing the one or more displays to display at least the representation of the sensor data;

wherein determining the location of the feature within the sensor data or the model comprises:

determining the location of the feature within the model; and wherein causing the one or more displays to display the indication of the feature at a position on the one or more displays corresponding to the location comprises:

causing the one or more displays to display the indication of the feature at the position within the representation of the sensor data.

15. The method of claim 7, wherein causing the one or more displays to display at least one of: (i) the representation of the sensor data, or (ii) the model, comprises:

causing the one or more displays to display at least the model;

wherein determining the location of the feature within the sensor data or the model comprises:

determining the location of the feature within the sensor data; and wherein causing the one or more displays to display the indication of the feature at a position on the one or more displays corresponding to the location comprises:

causing the one or more displays to display the indication of the feature at the position within the model.

16. The method of claim 7, wherein the sensor data is video frame data.

17. One or more non-transitory computer-readable media storing instructions that, when executed by one or more processors of a system, cause the system to perform operations comprising:

receiving, at the system, from a vehicle, the vehicle an autonomous vehicle:

sensor data captured by a sensor of the vehicle; and output data, wherein the output data is generated based at least in part on environmental data captured by one or more sensors of the vehicle and used by a planning component of the vehicle to navigate in an environment, wherein the sensor data and the output data are indicative of the environment;

causing one or more displays to display at least one of: (i) a representation of the sensor data, or (ii) a model of the environment based on the output data;

automatically determining a location of a feature within the sensor data or the model, the feature corresponding to a priority agent;

causing the one or more displays to display an indication of the feature at a position on the one or more displays corresponding to the location;

receiving, at the system, user input; and sending, by the system to the vehicle, data based on the user input to cause the vehicle to take an action, the data comprising data associated with the priority agent;

wherein causing the one or more displays to display at least one of: (i) the representation of the sensor data, or (ii) the model and causing the one or more displays to display the indication of the feature comprises:

causing the one or more displays to display at least the representation of the sensor data; and causing the one or more displays to display an indication of the priority agent within the representation of the sensor data.

18. The one or more non-transitory computer-readable media of claim 17, wherein: wherein at least one of:

receiving, at the system, the user input, comprises receiving at least a first user input, the first user input being associated with the feature and a first position on the one or more displays within the displayed representation of the sensor data or the displayed model, wherein receiving the first user input causes the location of the feature within the sensor data or the model to be determined based on the first position.

* * * * *